(12) United States Patent
Shirasaka et al.

(10) Patent No.: US 7,808,587 B2
(45) Date of Patent: Oct. 5, 2010

(54) LIQUID CRYSTAL DISPLAY APPARATUS AND LIQUID CRYSTAL PANEL

(75) Inventors: Yasuhiro Shirasaka, Kanagawa (JP); Kohichi Ohmura, Kanagawa (JP); Hisashi Kadota, Kanagawa (JP); Akiko Toriyama, Kanagawa (JP); Tsuyoshi Okazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 12/204,535

(22) Filed: Sep. 4, 2008

(65) Prior Publication Data

US 2009/0059174 A1 Mar. 5, 2009

(30) Foreign Application Priority Data

Sep. 5, 2007 (JP) .............................. 2007-229768

(51) Int. Cl.
 *G02F 1/1333* (2006.01)
 *G02F 1/1335* (2006.01)
(52) U.S. Cl. ................................ 349/111; 349/8; 349/9; 349/96; 349/110; 349/115
(58) Field of Classification Search .................. 349/111
 See application file for complete search history.

(56) References Cited

U.S. PATENT DOCUMENTS

| 7,018,054 | B2 * | 3/2006 | Miyashita et al. ........... 353/119 |
| 7,705,960 | B2 * | 4/2010 | Shimizu et al. ............. 349/158 |
| 2003/0025845 | A1 * | 2/2003 | Murakami et al. ............ 349/5 |
| 2006/0012735 | A1 * | 1/2006 | Yamada et al. .............. 349/110 |
| 2008/0198314 | A1 * | 8/2008 | Murade ....................... 349/111 |
| 2009/0059174 | A1 * | 3/2009 | Shirasaka et al. ............. 353/20 |

FOREIGN PATENT DOCUMENTS

| JP | 2000-338510 | 12/2000 |
| JP | 2001-091941 | 4/2001 |
| JP | 2002-196355 | 7/2002 |
| JP | 2003-027748 | 1/2003 |
| JP | 2003-202558 | 7/2003 |

\* cited by examiner

*Primary Examiner*—Michelle R Connelly Cushwa
(74) *Attorney, Agent, or Firm*—Sonnenschein Nath & Rosenthal LLP

(57) ABSTRACT

A light-shielding plate and a first light-shielding layer are arranged between a polarizing plate and a liquid crystal layer in a peripheral region of a liquid crystal panel so that linearly polarized light transmitted through the polarizing plate, which is a reflection polarizing plate, is not incident on the liquid crystal layer, but is reflected to the polarizing plate in the peripheral region.

10 Claims, 15 Drawing Sheets

LIQUID CRYSTAL DISPLAY APPARATUS AND LIQUID CRYSTAL PANEL

CROSS REFERENCES TO RELATED APPLICATIONS

The present invention contains subject matter related to Japanese Patent Application JP 2007-229768 filed in the Japanese Patent Office on Sep. 5, 2007, the entire contents of which are incorporated herein by reference.

BACKGROUND OF THE INVENTION

1. Field of the Invention

The present invention relates to liquid crystal display apparatuses and liquid crystal panels. In particular, the present invention relates to a liquid crystal display apparatus that uses a reflection polarizing plate as a polarizing plate, and in which light transmitted through the polarizing plate is incident on a pixel region of a liquid crystal panel to display an image. Also, the present invention relates to the liquid crystal panel used in the above-mentioned liquid crystal display apparatus.

2. Description of the Related Art

A liquid crystal display apparatus includes a liquid crystal panel in which a liquid crystal layer is sealed between a pair of substrates. The liquid crystal display apparatus displays an image on the liquid crystal panel in a pixel region where pixels are provided. For example, with a transmission liquid crystal panel, polarizing plates are arranged on both sides of the liquid crystal panel. The liquid crystal panel modulates light transmitted through one of the polarizing plates, and the modulated light is emitted to the other of the polarizing plates. Accordingly, an image is displayed.

The above-mentioned liquid crystal panel is, for example, active matrix type, which includes a TFT array substrate in which a thin film transistor (TFT) functioning as a pixel switching element is formed in a pixel region, and a counter substrate arranged to face the TFT array substrate with a gap interposed therebetween.

In the liquid crystal panel, the TFT array substrate and the counter substrate are bonded together by a seal member in a peripheral region. The gap between the TFT array substrate and the counter substrate is filled with liquid crystal, and hence, the liquid crystal layer is provided.

In the liquid crystal panel, if ionic impurity is mixed into the liquid crystal layer, image quality of a displayed image may be deteriorated. For example, the ionic impurity may be mixed into the liquid crystal layer when being eluted from the seal member. As the ionic impurity is dispersed into or aggregated in the liquid crystal layer, a display property of the liquid crystal panel may be deteriorated. In particular, when a thermosetting material, not a photo-curable material, is used to form the seal member, such a problem may be promoted by outgas generated by heat curing. To reduce occurrence of such a problem, various methods have been suggested.

For example, a method is suggested in which a peripheral electrode is provided in the peripheral region located at the periphery of the pixel region. The peripheral electrode is formed to surround the periphery of the pixel region in a frame-like form. With the peripheral electrode, a voltage is applied to the liquid crystal layer located in the peripheral region. Accordingly, impurity ions contained in the liquid crystal layer electrically adhere to the peripheral region. This can prevent the impurity ions from being dispersed into the pixel region (For example, see Japanese Unexamined Patent Application Publication Nos. 2000-338510 and 2002-196355).

In the TFT array substrate of the liquid crystal panel, a light-shielding portion is formed in the peripheral region so as to shield incident light thereon through the liquid crystal layer. A light-shielding layer is formed to surround the periphery of the pixel region in a frame-like form, and the light-shielding layer shields incident light on a peripheral circuit formed in the peripheral region by reflecting the light (for example, see Japanese Unexamined Patent Application Publication Nos. 2001-91941 and 2003-27748).

Meanwhile, in the above-mentioned liquid crystal display apparatus, the liquid crystal projector displays an image by irradiating the pixel region of the liquid crystal panel with light, and projecting light transmitted through the pixel region on a screen by a projection lens.

For example, in a three-plate liquid crystal projector that displays a color image, white light emitted from a light source is divided into light beams of three primary colors with a dichroic mirror. Then, three pixel regions of three liquid crystal panels are respectively irradiated with the divided light beams of the three primary colors. The light beams of the three primary colors are respectively modulated in the pixel regions of the three liquid crystal panels. The light beams modulated in the three pixel regions of the three liquid crystal panels are combined by a dichroic prism, and the combined light beams are emitted to the projection lens. Then, the projection lens projects the combined light beams in an enlarged manner, thereby displaying an image. That is, the liquid crystal panel functions as a light valve.

In such a liquid crystal display apparatus, a light intensity of light for irradiation of the liquid crystal panel is increased, to increase display quality of a displayed image. In particular, since the above-mentioned liquid crystal projector projects and displays an image in an enlarged manner, the light intensity for irradiation of the liquid crystal panel is markedly increased. Thus, the liquid crystal display apparatus employs members having light resistance and heat resistance.

For example, the polarizing plate employs a reflection polarizing plate which uses a light-reflective material, such as a metal lattice (for example, see Japanese Unexamined Patent Application Publication No. 2003-202558).

From among the incident light, the reflection polarizing plate transmits polarized light with a polarized component to be transmitted through the liquid crystal panel while reflecting polarized light with a polarized component except the polarized component to be transmitted through the liquid crystal panel. The reflection polarizing plate is formed, for example, by processing a metal film into a fine lattice-like form. Therefore, the reflection polarizing plate has good light resistance and good heat resistance.

SUMMARY OF THE INVENTION

In the liquid crystal display apparatus, however, when the reflection polarizing plate is arranged to face a light-incident surface of the liquid crystal panel, the image quality of a displayed image may be deteriorated.

For example, the image quality of a displayed image may be deteriorated because light called "stray light" is incident on the pixel region of the liquid crystal panel.

Specifically, since the light-shielding layer provided in the peripheral region shields the light transmitted through the reflection polarizing plate by reflecting the light to the reflection polarizing plate, the light reflected by the light-shielding layer to the reflection polarizing plate may advance to the reflection polarizing plate, and may be reflected again by the reflection polarizing plate to the pixel region. Thus, the light reflected by the reflection polarizing plate to the pixel region may be mixed into the displayed image as "stray light". This may cause the image quality of the displayed image to be deteriorated.

In particular, as described above, when the peripheral electrode is provided, such a problem may be promoted. That is, since the light transmitted through the reflection polarizing plate is incident on the light-shielding layer through the liquid crystal layer, and the light is reflected to the reflection polarizing plate through the liquid crystal layer, the light transmitted through the reflection polarizing plate may have a different polarized condition from that of the light reflected by the light-shielding layer, due to the liquid crystal layer driven with the peripheral electrode. Therefore, the occurrence of such a problem that the light is reflected again by the reflection polarizing plate, and mixed into the pixel region may be increased.

If a light-shielding film is provided on the liquid crystal panel to prevent the light transmitted through the reflection polarizing plate from being incident on the liquid crystal layer in the peripheral region, the occurrence of the above problem can be reduced. However, with the method in which the light-shielding film is provided by a single structure, a light-shielding portion has to be arranged to extend over a seal portion from an end portion of an effective display region to an end portion of one of the substrates so as to secure positional accuracy of the light-shielding film and to completely shield light while the light-shielding layer is arranged on an inner surface of the substrate of the liquid crystal display apparatus. Hence, it is difficult to irradiate the seal member with light. Thus, it is difficult to employ a photo-curable material for the seal member, and a thermosetting material has to be used instead. The liquid crystal layer may be contaminated by outgas generated by heat curing. This may deteriorate reliability. Alternatively, with the method in which the light-shielding film is provided on an inner surface and an outer surface of the one of the substrates, a step of forming the light-shielding film on the outer surface has to be performed after the liquid crystal display apparatus is assembled. Thus, in order to avoid damage on the assembled liquid crystal display apparatus, the number of steps has to be increased.

As described above, with the liquid crystal display apparatus, the image quality of the displayed image may be deteriorated due to the use of the reflection polarizing plate. In addition, the manufacturing steps may be complicated, and it is difficult to increase manufacturing efficiency.

Accordingly, it is desirable to provide a liquid crystal display apparatus and a liquid crystal panel capable of increasing image quality of a displayed image, and increasing manufacturing efficiency when a reflection polarizing plate is used.

A liquid crystal display apparatus according to an embodiment of the present invention includes a liquid crystal panel in which a liquid crystal layer is provided in a pixel region and a peripheral region; a reflection polarizing plate facing the pixel region and the peripheral region; and a light-shielding portion interposed between the liquid crystal layer and the polarizing plate in the peripheral region, and configured to shield light by reflecting light transmitted through the polarizing plate to the polarizing plate. The light transmitted through the polarizing plate is incident on the pixel region to display an image. The liquid crystal panel includes a first substrate facing the polarizing plate, a second substrate facing the polarizing plate through the first substrate, and facing the first substrate with a gap interposed therebetween, and a seal member configured to bond the first and second substrates together in the peripheral region, in which the liquid crystal layer is interposed between the first and second substrates, the pixel region and the peripheral region are provided at mutually facing surfaces of the first and second substrates, and the seal member is made of a photo-curable material cured by irradiation with light. The light-shielding portion includes a first light-shielding portion configured to cover a pixel adjacent region, the pixel adjacent region being a partial region of the peripheral region adjacent to the pixel region except a seal region corresponding to an area where the seal member is arranged, and a second light-shielding portion configured to cover at least a region of the peripheral region except the region covered with the first light-shielding portion, in which the first light-shielding portion is located closer to the liquid crystal layer than the second light-shielding portion is.

A liquid crystal panel according to another embodiment of the present invention includes a liquid crystal layer provided in a pixel region and a peripheral region; a reflection polarizing plate facing the pixel region and the peripheral region; a light-shielding portion interposed between the liquid crystal layer and the polarizing plate in the peripheral region, and configured to shield light by reflecting light transmitted through the polarizing plate to the polarizing plate; a first substrate facing the polarizing plate; a second substrate facing the polarizing plate through the first substrate, and facing the first substrate with a gap interposed therebetween; and a seal member configured to bond the first and second substrates together in the peripheral region. The liquid crystal layer is interposed between the first and second substrates. The pixel region and the peripheral region are provided at mutually facing surfaces of the first and second substrates. The seal member is made of a photo-curable material cured by irradiation with light. The light-shielding portion includes a first light-shielding portion configured to cover a pixel adjacent region, the pixel adjacent region being a partial region of the peripheral region near the pixel region except a seal region corresponding to an area where the seal member is arranged, and a second light-shielding portion configured to cover at least a region of the peripheral region except the region covered with the first light-shielding portion, in which the first light-shielding portion is located closer to the liquid crystal layer than the second light-shielding portion is.

With any of the embodiments of the present invention, the light-shielding portion shields the polarized light transmitted through the polarizing plate in the peripheral region so that the polarized light transmitted through the polarizing plate, which is a reflection polarizing plate, is not incident on the liquid crystal layer, but is reflected to the polarizing plate in the peripheral region.

Accordingly, the liquid crystal display apparatus and the liquid crystal panel can be provided, which are capable of increasing the image quality of the displayed image, and increasing the manufacturing efficiency when the reflection polarizing plate is used.

DESCRIPTION OF THE PREFERRED EMBODIMENTS

Hereinafter, example embodiments of the present invention are described.

First Embodiment

A liquid crystal display apparatus according to a first embodiment of the present invention is described below.

Figure 1:
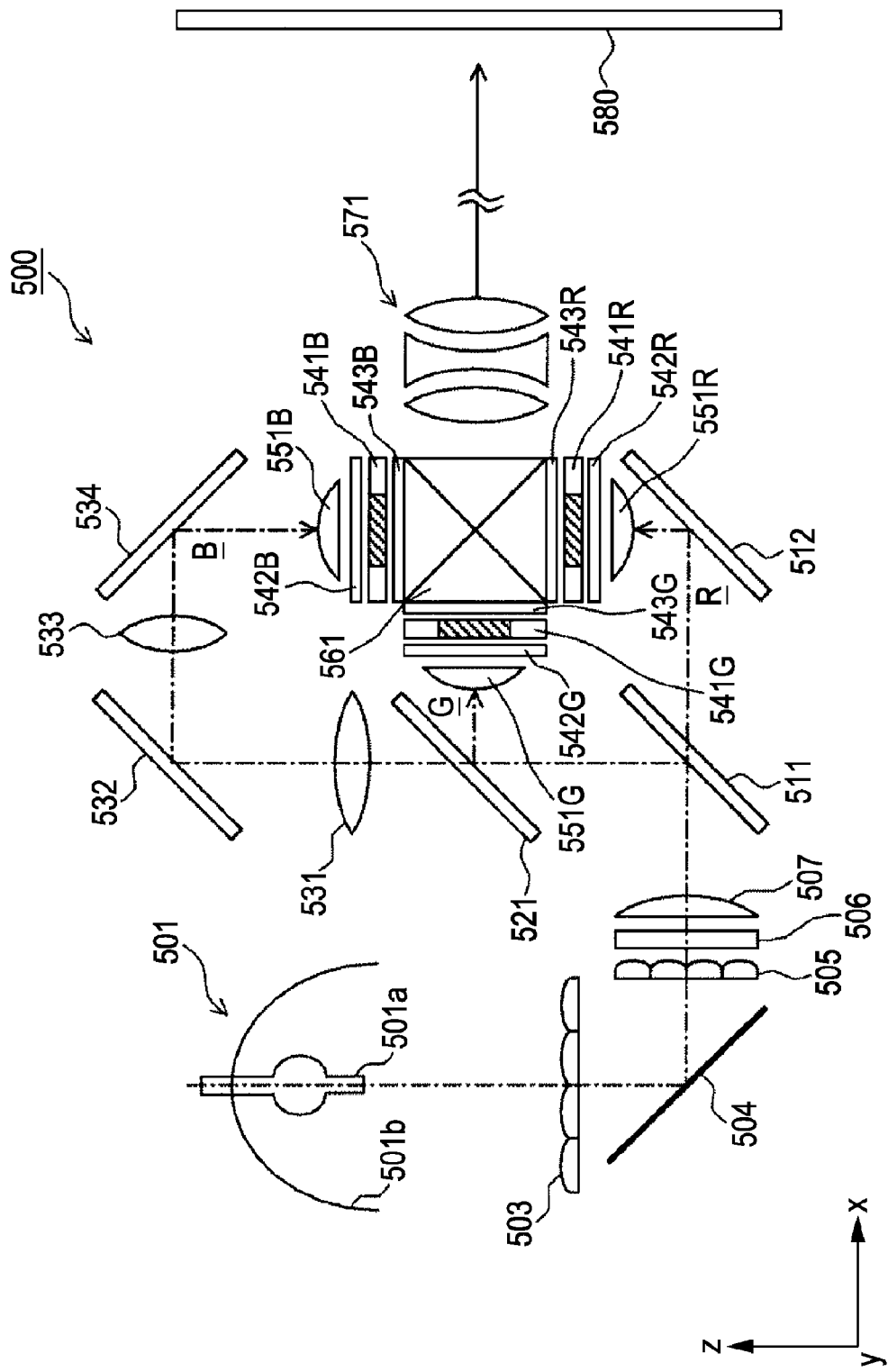
FIG. 1 is a top view showing a liquid crystal display apparatus according to a first embodiment of the present invention.

FIG. 1 is a top view showing the liquid crystal display apparatus according to the first embodiment of the present invention.

Referring to FIG. 1, a liquid crystal display apparatus 500 of this embodiment is a three-plate liquid crystal projector.

The liquid crystal display apparatus 500 includes a light source 501, a first lens array 503, a first reflection mirror 504, a second lens array 505, a PS combining element 506, a first dichroic mirror 511, a second reflection mirror 512, a second dichroic mirror 521, a first relay lens 531, a third reflection mirror 532, a second relay lens 533, a fourth reflection mirror 534, a first liquid crystal display portion (first LCD portion) 541R, a second liquid crystal display portion (second LCD portion) 541G, a third liquid crystal display portion (third LCD portion) 541B, a first condenser lens 551R, a second condenser lens 551G, a third condenser lens 551B, a dichroic prism 561, and a projection lens unit 571. The liquid crystal display apparatus 500 displays a color image by projecting the image on a screen 580.

The components of the liquid crystal display apparatus 500 according to this embodiment are sequentially described below.

Referring to FIG. 1, the light source 501 includes a lamp 501a and a reflector 501b. The lamp 501a uses, for example, a metal halide lamp, and emits white light. Alternatively, the lamp 501a may use a lamp, such as an ultrahigh pressure mercury lamp, a halogen lamp, or a xenon lamp. The reflector 501b has a light-reflective reflection surface. The reflection surface reflects light emitted from the lamp 501a. The reflector 501b has, for example, a rotationally symmetric concave surface, such as a spheroidal mirror or a paraboloidal surface. The reflector 501b is arranged so that a luminous point of an illuminant of the lamp 501a is located at a focal position of the reflector 201b. The light source 501 irradiates the first LCD portion 541R, the second LCD portion 541G, and the third LCD portion 541B with light through the respective components.

The first lens array 503 has a plurality of lenses arrayed in a matrix form. The first lens array 503 divides the light emitted from the light source 501 into a plurality of light beams, and emits the light beams to the first reflection mirror 504.

The first reflection mirror 504 reflects the light transmitted through the first lens array 503 to the second lens array 505.

The second lens array 505 has a similar configuration to that of the first lens array 503. The second lens array 505 has a plurality of microlenses arrayed in a matrix form. The second lens array 505 emits the light reflected by the first reflection mirror 504 to the first dichroic mirror 511.

The PS combining element 506 combines a P-polarized component and an S-polarized component contained in the light emitted from the second lens array 505 into one of these components, and emits the combined polarized component. In particular, the PS combining element 506 has a phase plate (not shown), which is, for example, a ½ wavelength plate, provided at a position between the adjacent microlenses of the second lens array 505. The PS combining element 506 separates the light emitted from the second lens array 505 into the P-polarized component and the S-polarized component, then, emits one of the P-polarized component and the S-polarized component (for example, P-polarized component) with the polarization direction held unchanged, converts the other of the components (for example, S-polarized component) into the one of the components (for example, P-polarized component) by an action with the phase plate, and emits the converted component. The light emitted from the PS combining element 506 is condensed by a condenser lens 507, and is incident on the first dichroic mirror 511.

From among the light emitted from the second lens array 505, the first dichroic mirror 511 reflects blue component light B and green component light G, and transmits red component light R. Hence, the white light emitted from the second lens array 505 is separated into a plurality of different wavelength bands. The red component light R transmitted through the first dichroic mirror 511 is emitted to the second reflection mirror 512. The blue component light B and the green component light G reflected by the first dichroic mirror 511 are emitted to the second dichroic mirror 521.

The second reflection mirror 512 reflects the red component light R transmitted through the first dichroic mirror 511, so that the red component light R is emitted to the first LCD portion 541R through the first condenser lens 551R.

From among the blue component light B and the green component light G reflected by the first dichroic mirror 511, the second dichroic mirror 521 transmits the blue component light B and reflects the green component light G. Hence, the light reflected by the first dichroic mirror 511 is separated. The green component light G reflected by the second dichroic mirror 521 is emitted to the second LCD portion 541G through the second condenser lens 551G. The blue component light B transmitted through the second dichroic mirror 521 is transmitted through the first relay lens 531, and is emitted to the third reflection mirror 532.

The first relay lens 531 allows the blue component light B transmitted through the second dichroic mirror 521 to be transmitted therethrough to the third reflection mirror 532. The first relay lens 531 is provided for increasing utilization efficiency of the blue component light B which has a longer optical path than those of other color light.

The third reflection mirror 532 reflects the blue component light B transmitted through the first relay lens 531 to the second relay lens 533.

The second relay lens 533 transmits the blue component light B reflected by the third reflection mirror 532 to the fourth reflection mirror 534. Similarly to the above-described first relay lens 531, the second relay lens 533 is provided for increasing the utilization efficiency of the blue component light B which has the longer optical path than those of other color light.

The fourth reflection mirror 534 emits the blue component light B transmitted through the second relay lens 533 to the third LCD portion 541B through the third condenser lens 551B.

The first, second, and third LCD portions 541R, 541G, and 541B are arranged so as to respectively face light-incident surfaces of the dichroic prism 561. Though described layer in detail, the first, second, and third LCD portions 541R, 541G, and 541B each have a liquid crystal panel.

A pair of polarizing plates 542R and 543R are arranged on both surfaces of the liquid crystal panel of the first LCD portion 541R. The liquid crystal panel modulates the red component light R which is incident from the first condenser lens 551R through the one polarizing plate 542R provided at the incident side. The modulated light is emitted to the dichroic prism 561 through the other polarizing plate 543R provided at the exit side.

Similarly to the first LCD portion 541R, a pair of polarizing plates 542G and 543G are arranged on both surfaces of the liquid crystal panel of the second LCD portion 541G. The liquid crystal panel modulates the green component light G which is incident from the second condenser lens 551G through the one polarizing plate 542G provided at the incident side. The modulated light is emitted to the dichroic prism 561 through the other polarizing plate 543G provided at the exit side.

Similarly to the first LCD portion 541R and the second LCD portion 541G, a pair of polarizing plates 542B and 543B are arranged on both surfaces of the liquid crystal panel of the third LCD portion 541B. The liquid crystal panel modulates the blue component light B which is incident from the third condenser lens 551B through the one polarizing plate 542B provided at the incident side. The modulated light is emitted to the dichroic prism 561 through the other polarizing plate 543B provided at the exit side.

In this embodiment, the polarizing plates 542R, 542G, and 542B provided at the incident side of the first, second, and third LCD portions 541R, 541G, and 541B are reflection polarizing plates. In particular, each of the polarizing plates 542R, 542G, and 542B is formed by processing a metal film into a fine lattice-like form, so as to transmit, from among the incident light, polarized light with a polarized component to be transmitted to the liquid crystal panel while reflecting polarized light with a polarized component except the polarized component to be transmitted to the liquid crystal panel. Each polarizing plate is arranged to face a pixel region and a peripheral region of each liquid crystal panel, so that the polarizing plate transmits the polarized light having a predetermined polarized component, to the pixel region and the peripheral region.

The polarizing plates 543R, 543G, and 543B provided at the exit side of the first, second, and third LCD portions 541R, 541G, and 541B are absorption polarizing plates. In particular, from among the incident light, each of the polarizing plates 543R, 543G, and 543B transmits polarized light with a necessary polarized component while absorbing polarized light with a polarized component except the polarized component to be transmitted therethrough. In the LCD portions 541R, 541G, and 541B, the polarizing plates 542R, 542G, and 542B provided at the light-incident sides and the polarizing plates 543R, 543G, and 543B provided at the exit sides are arranged in a cross nicol manner. Though described later in detail, the liquid crystal mode of the liquid crystal panel, which is provided in each of the first, second, and third LCD portions 541R, 541G, and 541B, is VA mode. In this embodiment, the first, second, and third LCD portions 541R, 541G, and 541B perform image display by the normally black method.

The details of the first, second, and third LCD portions 541R, 541G, and 541B will be described later.

The dichroic prism 561 generates a color image by combining light of the respective color components transmitted through the first, second, and third LCD portions 541R, 541G, and 541B. The dichroic prism 561 emits the generated color image to the projection lens unit 571.

The projection lens unit 571 projects the color image generated by the dichroic prism 561 on the screen 580 in an enlarged manner, so that the color image is displayed on the screen 580. That is, the projection lens unit 571 projects light emitted from the pixel regions of the liquid crystal panels which are irradiated with the light from the light source 501. The projection lens unit 571 includes a plurality of lenses, and has a zoom function and a focus function to adjust the size of the image to be projected.

Now, the first, second, and third LCD portions 541R, 541G, and 541B included in the above-described liquid crystal display apparatus 500 are described below in more detail. The first, second, and third LCD portions 541R, 541G, and 541B have similar configurations. Hence, the first LCD portion 541R is described on behalf of the first, second, and third LCD portions 541R, 541G, and 541B.

Figure 2:
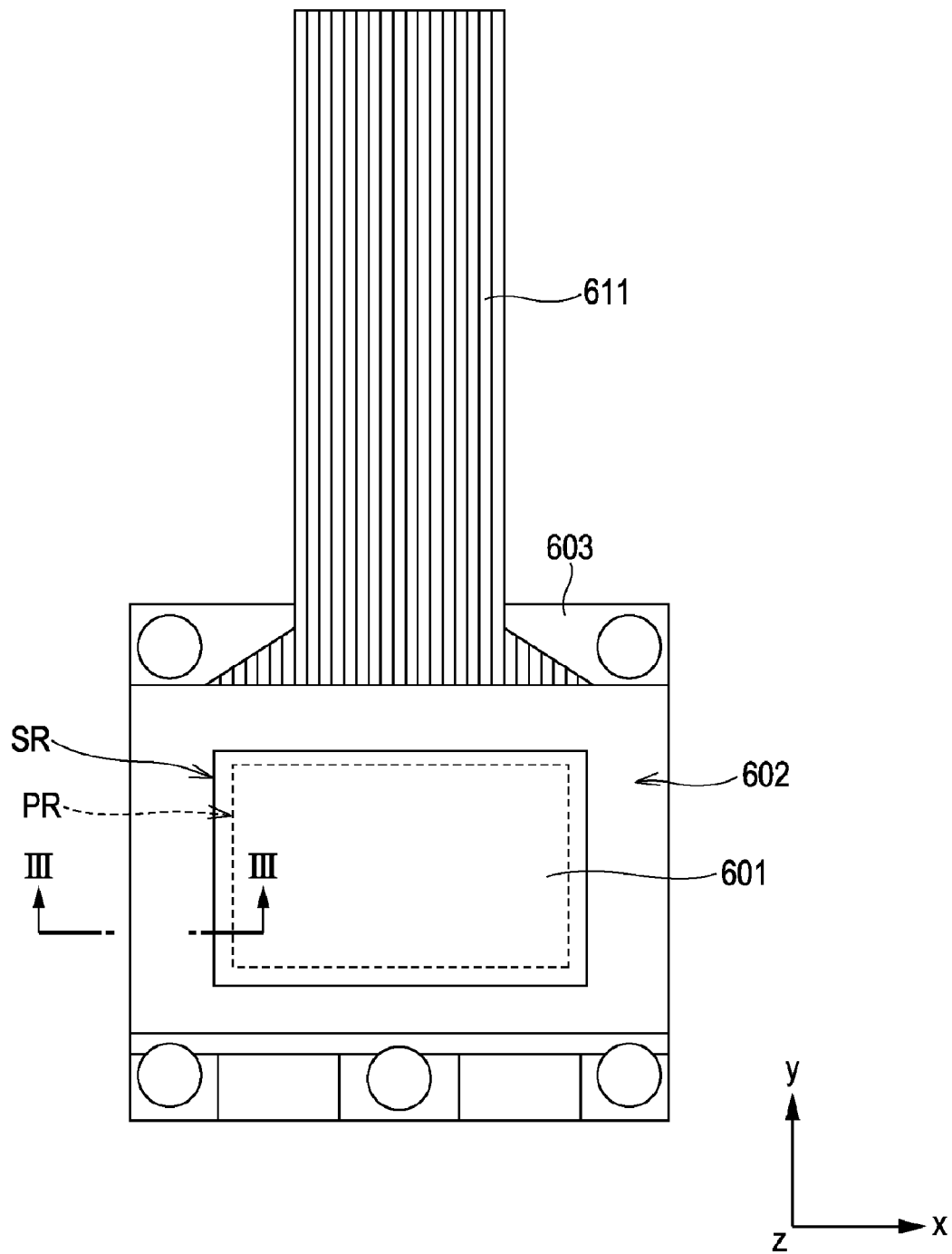
FIG. 2 is a plan view showing a first liquid crystal display portion according to the first embodiment of the present invention.
Figure 3:
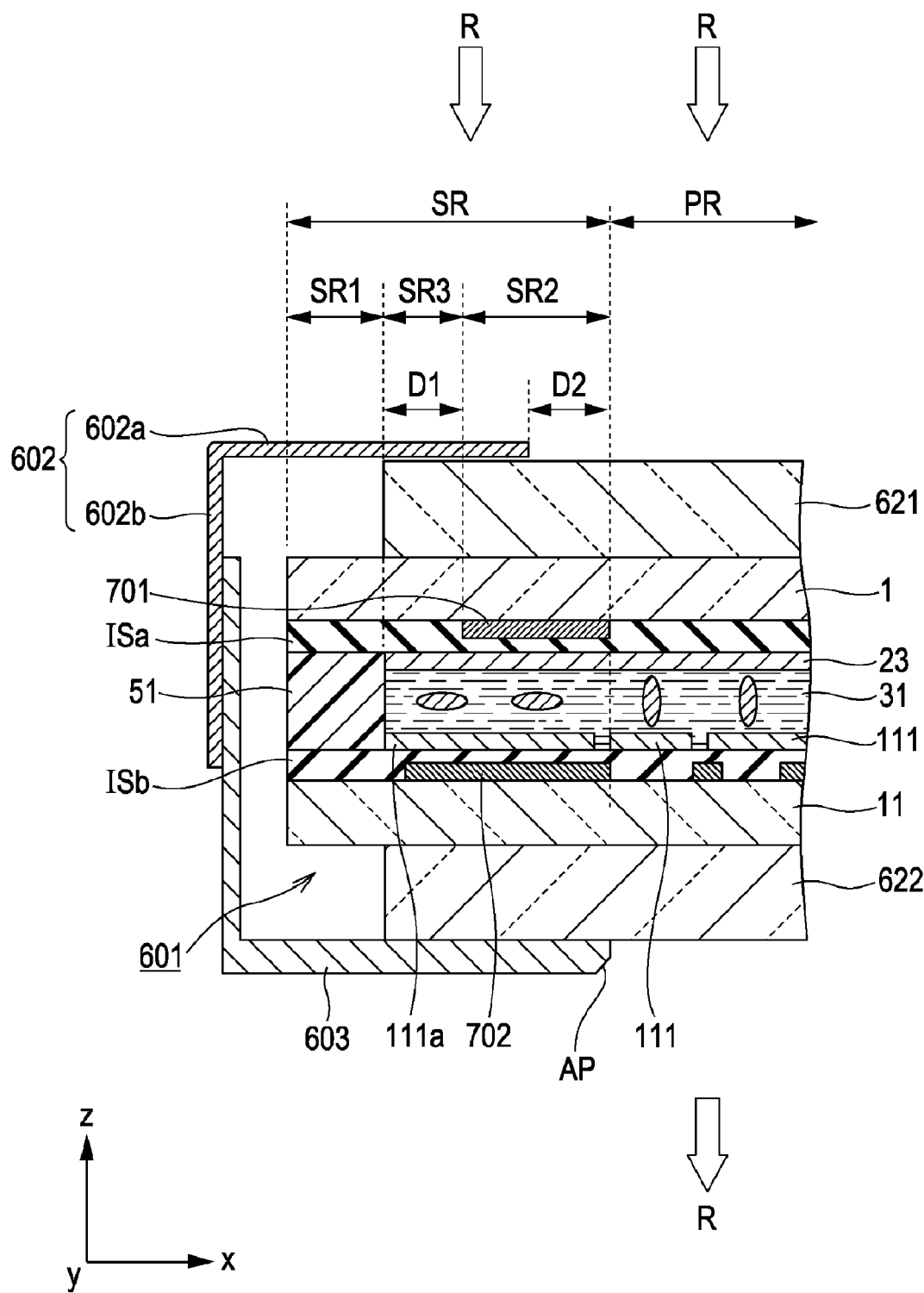
FIG. 3 is a cross section showing the first liquid crystal display portion according to the first embodiment of the present invention.

FIGS. 2 and 3 are illustrations showing the first LCD portion 541R according to the first embodiment of the present invention.

FIG. 2 is a plan view showing the first LCD portion 541R according to the first embodiment of the present invention. FIG. 3 is a cross section showing the first LCD portion 541R according to the first embodiment of the present invention.

FIG. 3 schematically illustrates a primary portion of the first LCD portion 541R, the cross section which is taken along line III-III in FIG. 2.

Referring to FIG. 2, the first LCD portion 541R includes a liquid crystal panel 601, a light-shielding plate 602, and a FPC substrate 611. Also, the first LCD portion 541R further includes a first dustproof glass substrate 621, a second dustproof glass substrate 622, and a frame 603 as shown in FIG. 3. In the first LCD portion 541R, as described above, the red component light R transmitted through the polarizing plate 542R is emitted on the liquid crystal panel 601, and is transmitted therethrough. The respective components are sequentially described below.

The liquid crystal panel 601 of the first LCD portion 541R is described.

Referring to FIG. 2, the liquid crystal panel 601 has a pixel region PR and a peripheral region SR located at the periphery of the pixel region PR. The light-shielding plate 602 is arranged to surround the periphery of the peripheral region SR.

Figure 4:
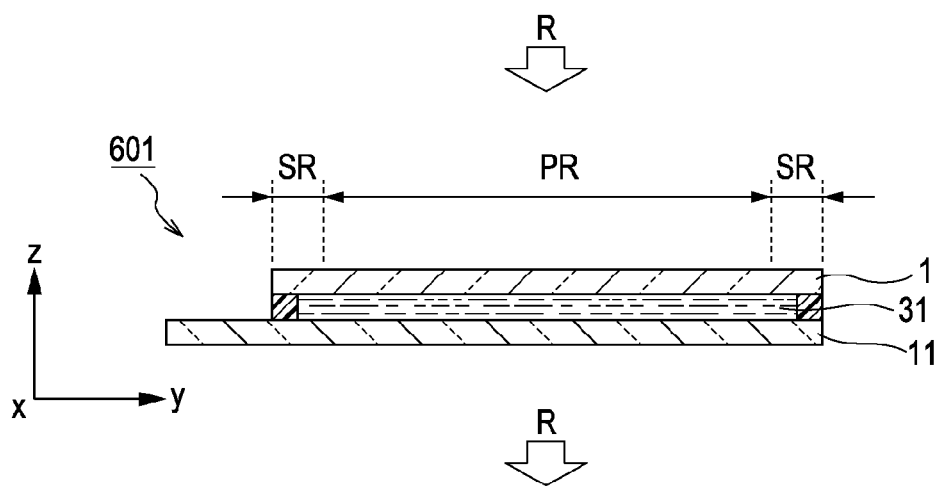
FIG. 4 is a cross section showing a liquid crystal panel according to the first embodiment of the present invention.
Figure 5:
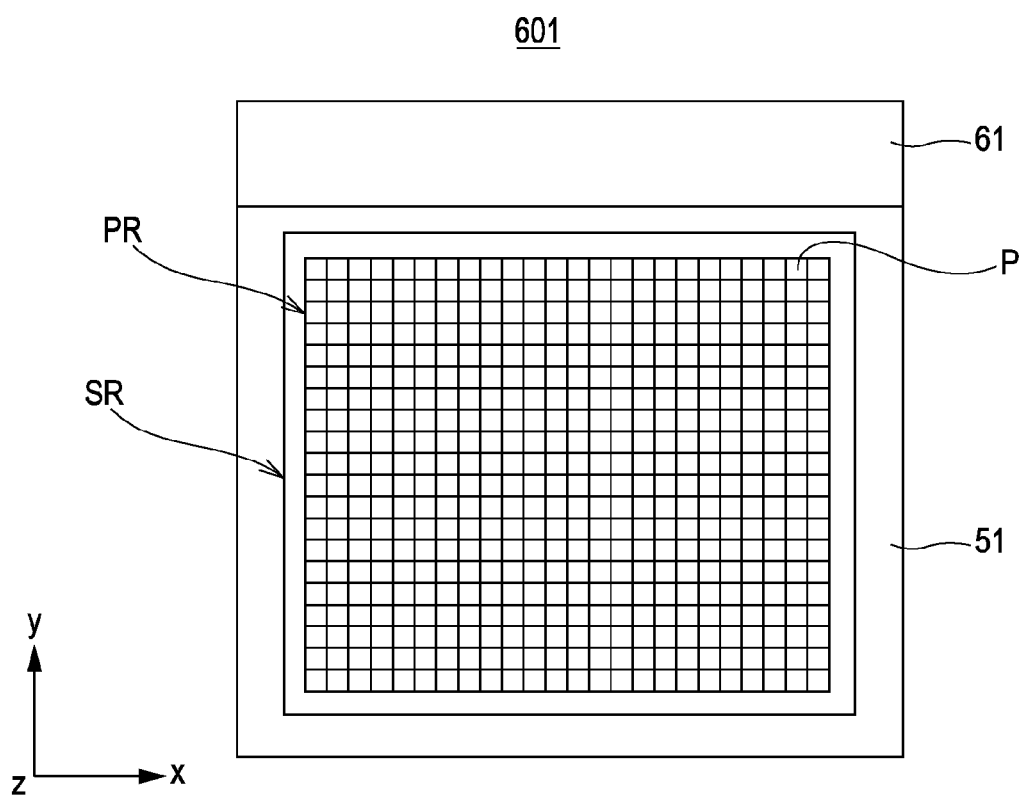
FIG. 5 is a plan view showing the liquid crystal panel according to the first embodiment of the present invention.
Figure 6:
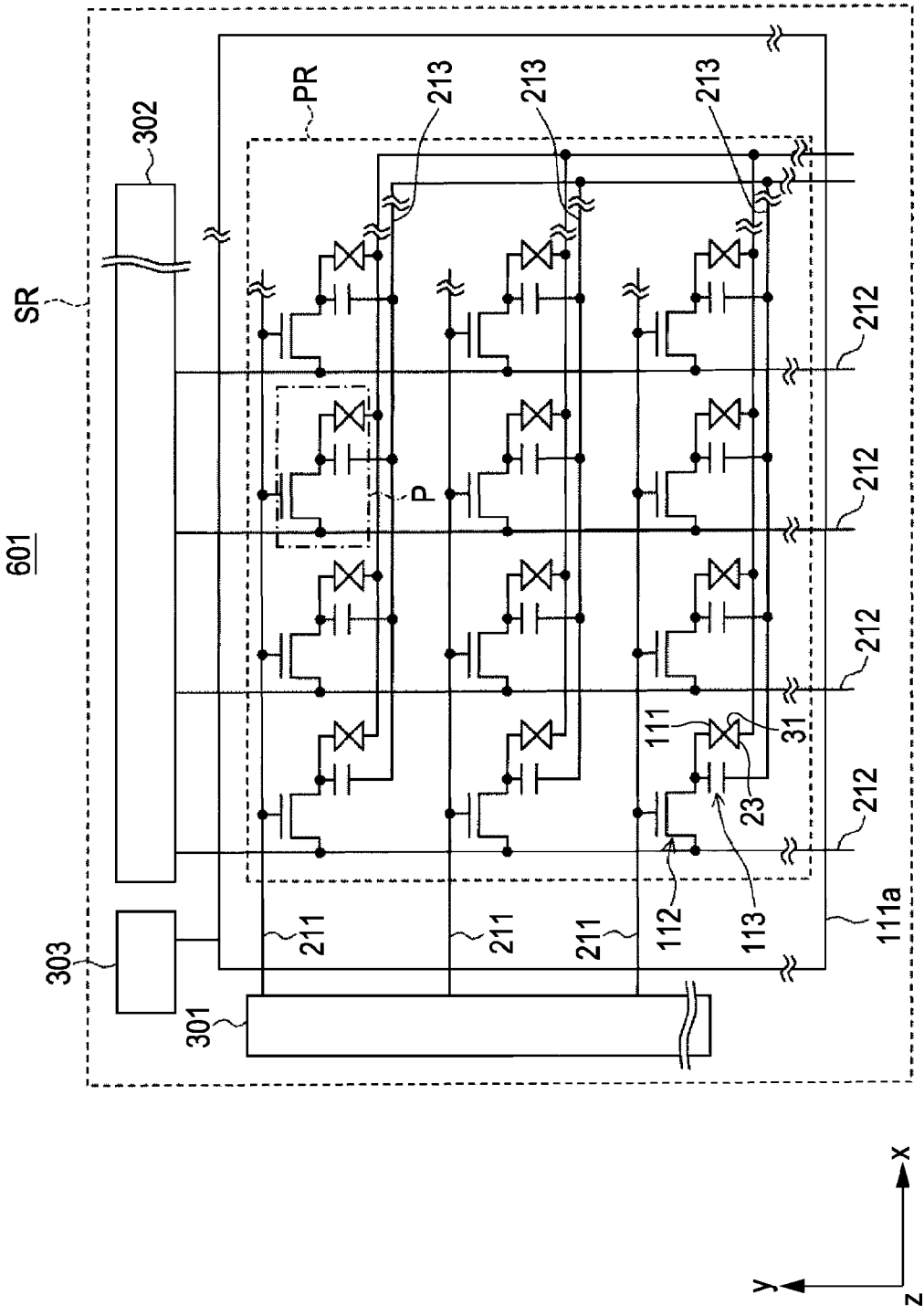
FIG. 6 is a circuit diagram of the liquid crystal panel according to the first embodiment of the present invention.

FIGS. 4, 5, and 6 are illustrations showing the liquid crystal panel 601.

FIG. 4 is a cross section showing the liquid crystal panel 601 according to the first embodiment of the present invention. FIG. 5 is a plan view showing the liquid crystal panel 601 according to the first embodiment of the present invention. FIG. 6 is a circuit diagram of the liquid crystal panel 601 according to the first embodiment of the present invention.

The liquid crystal panel 601 is active matrix type. Referring to FIG. 4, the liquid crystal panel 601 includes a counter substrate 1, a TFT array substrate 11, a liquid crystal layer 31, and a seal member 51. The liquid crystal panel 601 is transmission type. The liquid crystal panel 601 receives the red component light R (see FIG. 1), which is transmitted through the polarizing plate 542R, from the counter substrate 1, and then, emits the red component light R to the TFT array substrate 11 through the liquid crystal layer 31.

In the liquid crystal panel 601, referring to FIG. 4, the counter substrate 1 and the TFT array substrate 11 face each other with a gap interposed therebetween, and are bonded together by the seal member 51. Liquid crystal is injected into the gap between the counter substrate 1 and the TFT array substrate 11 to define the liquid crystal layer 31.

Referring to FIG. 5, the counter substrate 1 and the TFT array substrate 11 are bonded together by the seal member 51 at a peripheral end portion of mutually facing surfaces thereof. Referring to FIGS. 4 and 5, the pixel region PR and the peripheral region SR are provided at the mutually facing surfaces of the counter substrate 1 and the TFT array substrate 11.

In the liquid crystal panel 601, the pixel region PR is an effective pixel region. Referring to FIG. 5, a plurality of pixels P are arrayed in a matrix form in the pixel region PR. In particular, referring to FIG. 5, the plurality of pixels P are arranged in an array in x and y directions. The pixels P are provided at a pixel pitch of, for example, 20 µm or smaller. A light-shielding layer that shields light is provided between the adjacent pixels P to divide the pixels P.

Also, referring to FIG. 5, the liquid crystal panel 601 includes a terminal portion 61. The terminal portion 61 is connected to the above-described FPC substrate 611. The liquid crystal panel 601 performs an image display operation in the pixel region PR in accordance with an electric signal supplied from the terminal portion 61 through the FPC substrate 611.

Referring to FIG. 6, in the pixel region PR, a counter electrode 23, a pixel electrode 111, a pixel switching element 112, and a storage capacitor element 113 are provided for each of the pixels P. In addition, in the pixel region PR, a scanning wiring line 211, a signal wiring line 212, and a storage capacitor wiring line 213 are provided.

Referring to FIG. 4, in the pixel region PR, the red component light R being incident from the counter substrate 1 is emitted to the TFT array substrate 11 through the liquid crystal layer 31. An image is displayed with the red component light R.

Though described later in detail, in the pixel region PR, referring to FIG. 3, the counter electrode 23 and the pixel electrode 111 face each other with the liquid crystal layer 31 interposed therebetween. The liquid crystal layer 31 is driven such that a potential difference is generated between the counter electrode 23 and the pixel electrode 111, and hence, a voltage is applied to the liquid crystal layer 31 provided in the pixel region PR. Accordingly, a ratio of the red component light R to be transmitted through the pixel region PR is controlled, and thus an image is displayed.

Meanwhile, in the peripheral region SR of the liquid crystal panel 601, referring to FIG. 3, a peripheral electrode 111a, a first light-shielding layer 701, and a second light-shielding layer 702 are formed. Also, though not shown in FIG. 3, referring to FIG. 6, peripheral circuits, such as a gate driver 301, a source driver 302, and a voltage control circuit 303, are provided in the peripheral region SR.

Though described later in detail, in the peripheral region SR, referring to FIG. 3, the counter electrode 23 is formed to extend from the pixel region PR to the peripheral region SR at the counter substrate 1, and the peripheral electrode 111a faces the counter electrode 23 formed in the peripheral region SR at the counter substrate 1 with the liquid crystal layer 31 interposed therebetween. When the liquid crystal layer 31 is driven such that a potential difference is generated between the counter electrode 23 and the peripheral electrode 111a, a voltage is applied to the liquid crystal layer 31 interposed therebetween in the peripheral region SR. Accordingly, impurity ions contained in the liquid crystal layer 31 electrically adhere to the peripheral region SR, and hence, the impurity ions can be prevented from being dispersed into the pixel region PR. In the peripheral region SR, the first light-shielding layer 701 is provided on the counter substrate 1, and the second light-shielding layer 702 is provided on the TFT array substrate 11. Also, the light-shielding plate 602 is provided at the liquid crystal panel 601 near the counter substrate 1. The red component light R to be incident on the liquid crystal panel 601 through the polarizing plate 542R is shielded by the first and second light-shielding layers 701 and 702, and the light-shielding plate 602.

The components of the liquid crystal panel 601 are described below.

The counter substrate 1 of the liquid crystal panel 601 is a substrate made of a light-transmissive, insulating material, such as quartz, glass, or plastic. The counter substrate 1 faces the TFT array substrate 11 with the gap interposed therebetween as described above. Referring to FIG. 3, the counter electrode 23 and the first light-shielding layer 701 are formed at a surface of the counter substrate 1 facing the TFT array substrate 11. Referring to FIGS. 3 and 4, the first dustproof glass substrate 621 is provided on a surface of the counter substrate 1 opposite to the surface thereof facing the TFT array substrate 11.

The counter electrode 23 provided at the counter substrate 1 is, for example, a transparent electrode made of indium tin oxide (ITO). Referring to FIG. 3, the counter electrode 23 is formed at the surface of the counter substrate 1 facing the TFT array substrate 11 with an interlaminar insulation film ISa interposed therebetween. In the pixel region PR, referring to FIG. 3, the counter electrode 23 faces a plurality of the pixel electrodes 111 provided at the TFT array substrate 11. In the peripheral region SR, referring to FIG. 3, the counter electrode 23 faces the peripheral electrode 111a provided at the TFT array substrate 11. That is, the counter electrode 23 is spread over the entire surface of the counter substrate 1, so as to serve as a common electrode for the plurality of pixel electrodes 111 and the peripheral electrode 111a.

Also, referring to FIG. 3, the first light-shielding layer 701 is formed on the surface of the counter substrate 1 facing the TFT array substrate 11. The surface of the first shielding layer 701 is covered with the interlaminar insulation film ISa, and hence, the surface is flattened. The first light-shielding layer 701 is formed to surround the periphery of the pixel region PR in a frame-like form. The first light-shielding layer 701 is provided to correspond to the peripheral region SR. The first light-shielding layer 701 shields light by reflecting the red component light R transmitted through the polarizing plate 542R to the polarizing plate 542R. In particular, the first light-shielding layer 701 is interposed between the polarizing plate 542R and the liquid crystal layer 31 so as to reflect the light transmitted through the polarizing plate 542R to the polarizing plate 542R before the light is incident on the liquid crystal layer 31. In this embodiment, the first light-shielding layer 701 is provided closer to the counter substrate 1 than the liquid crystal layer 31 so that the light transmitted through the polarizing plate 542R is not incident on the liquid crystal layer 31, but is reflected to the polarizing plate 542R. Also, the first light-shielding layer 701 is provided so as to be located closer to the liquid crystal layer 31 than the light-shielding plate 602 is. For example, the first light-shielding layer 701 is made of a light-reflective metal material such as aluminum, to prevent light from being incident on the peripheral circuits provided in the peripheral region SR. The first light-shielding layer 701 is formed, for example, by depositing a metal film using a metal material, and then performing pattern processing by lithography technology.

Referring to FIG. 3, the first light-shielding layer 701 is formed on the counter substrate 1 to cover a pixel adjacent region SR2, which is a partial region of the peripheral region SR adjacent to the pixel region PR except a seal region SR1 corresponding to an area where the seal member 51 is arranged. The first light-shielding layer 701 is formed in the peripheral region SR, so as to cover the pixel adjacent region SR2, which is the region at a distance D1 of 100 μm or larger from an end portion of the seal region SR1 to the pixel region PR.

The TFT array substrate 11 of the liquid crystal panel 601 is a substrate made of a light-transmissive, insulating material, such as quartz, glass, or plastic. The TFT array substrate 11 faces the counter substrate 1 with the gap interposed therebetween as described above. Referring to FIG. 3, the pixel electrodes 111, the peripheral electrode 111a, and the second light-shielding layer 702 are formed at the surface of the TFT array substrate 11 facing the counter substrate 1. In addition, though not shown in FIG. 3, referring to the components shown FIG. 6, the pixel switching element 112, the storage capacitor element 113, the scanning wiring line 211, the signal wiring line 212, and the storage capacitor wiring line 213 are formed in the pixel region PR at the surface of the TFT array substrate 11 facing the counter substrate 1. In the peripheral region SR, the gate driver 301, the source driver 302, and the voltage control circuit 303 are provided. Referring to FIGS. 3 and 4, the second dustproof glass substrate 622 is provided on a surface of the TFT array substrate 11 opposite to the surface thereof facing the counter substrate 1.

The pixel electrode 111 provided at the TFT array substrate 11 is, for example, a transparent electrode made of ITO. Referring to FIG. 3, the pixel electrode 111 is provided at the surface of the TFT array substrate 11 facing the counter substrate 1. The plurality of pixel electrodes 111 are provided in the pixel region PR to face the counter electrode 23 provided at the counter substrate 1. The plurality of pixel electrodes 111 are formed at a distance from each other. Referring to FIG. 6, the plurality of pixel electrodes 111 are arrayed in a matrix in the x direction and the y direction substantially orthogonal to the x direction. The plurality of pixel electrodes 111 are provided with the pixel switching elements 112 one by one, and are connected to drain electrodes of the pixel switching elements 112. Hence, data signals supplied through the signal wiring line 212 are applied as display voltages to the liquid crystal layer 31 through the pixel switching elements 112.

The peripheral electrode 111a provided at the TFT array substrate 11 is, for example, a transparent electrode made of ITO. Referring to FIG. 3, the peripheral electrode 111a is provided at the surface of the TFT array substrate 11 facing the counter substrate 1. The peripheral electrode 111a is provided in the peripheral region SR to face the counter electrode 23 provided at the counter substrate 1. Also, referring to FIG. 6, the peripheral electrode 111a is formed in the peripheral region SR to continuously surround the periphery of the pixel region PR. In particular, the peripheral electrode 111a is formed in a frame-like form to extend in parallel to the respective sides of the pixel region PR which is provided as a rectangular surface, that is, to extend in a rectangular form. The peripheral electrode 111a is connected to the voltage control circuit 303. The voltage control circuit 303 applies a predetermined voltage to the peripheral electrode 111a to cause a potential difference to be generated between the counter electrode 23 and the peripheral electrode 111a, and hence, the voltage is applied to the interposed liquid crystal layer 31 in the peripheral region SR. Accordingly, the impurity ions contained in the liquid crystal layer 31 electrically adhere to the peripheral region SR, and hence the impurity ions are prevented from being dispersed into the pixel region PR.

In the TFT array substrate 11, referring to FIG. 6, a plurality of the pixel switching elements 112 are provided in a matrix form in the x and y directions to respectively correspond to the plurality of pixel electrodes 111. Each pixel switching element 112 is, for example, a TFT, whose channel region is, for example, formed of a semiconductor thin film of polycrystalline silicon. In the TFT, serving as the pixel switching element 112, a gate electrode is connected to the scanning wiring line 211. A scanning signal is input to the gate electrode from the gate driver 301 through the scanning wiring line 211, and hence, the pixel switching element 112 is driven and controlled. Also, a source electrode is connected to the signal wiring line 212. A data signal is supplied to the source electrode from the source driver 302 through the signal wiring line 212. Further, a drain electrode of the pixel switching element 112 is connected to the pixel electrode 111 and the storage capacitor element 113. When a scanning signal is applied to the gate electrode and thus the gate electrode is turned ON, the drain electrode applies a data signal to the pixel electrode 111 and the storage capacitor element 113.

In the TFT array substrate 11, referring to FIG. 6, a plurality of the storage capacitor elements 113 are provided in a matrix form in the x and y directions to respectively correspond to the plurality of pixel electrodes 111. Each storage capacitor element 113 is configured such that a dielectric film is interposed between a pair of electrodes. One of the electrodes is connected to the drain electrode of the storage capacitor element 213, and the other of the electrodes is connected to the storage capacitor wiring line 213. The storage capacitor element 113 is formed in parallel to a capacitance of the liquid crystal layer 31. The storage capacitor element 113 stores an electric charge caused by a data signal applied to the liquid crystal layer 31.

In the TFT array substrate 11, referring to FIG. 6, the scanning wiring line 211 extends in the x direction, and is connected to the pixel switching elements 112 arrayed in the x direction. Also, a plurality of the scanning wiring lines 211 are arranged at a distance in the y direction, so as to correspond to the pixel switching elements 112 arrayed in the y direction. The scanning wiring lines 211 are connected to the gate driver 301, and supply scanning signals output from the gate driver 301 to the pixel switching elements 112, so as to sequentially select rows of the pixel electrodes 111 by time division.

In the TFT array substrate 11, referring to FIG. 6, the signal wiring line 212 extends in the y direction, and is connected to the pixel switching elements 112 arrayed in the y direction. Also, a plurality of the signal wiring lines 212 are arranged at a distance in the x direction, so as to correspond to the pixel switching elements 112 arrayed in the x direction. The signal wiring lines 212 are connected to the source driver 302, and supply data signals output from the source driver 302 to the pixel electrodes 111 through the pixel switching elements 112.

In the TFT array substrate 11, referring to FIG. 6, the storage capacitor wiring line 213 is formed at the TFT array substrate 11 to extend in the x direction, and is connected to the storage capacitor elements 113. Also, a plurality of the signal wiring lines 213 are arranged at a distance in the y direction, so as to correspond to the storage capacitor elements 113 arrayed in the y direction. An end of each storage capacitor wiring line 213 is connected to the storage capacitor element 113, and another end thereof is connected to the counter electrode 23.

In the TFT array substrate 11, referring to FIG. 3, the second light-shielding layer 702 is formed at the surface of the TFT array substrate 11 facing the counter substrate 1. The surface of the second light-shielding layer 701 is covered with an interlaminar insulation film ISb, and hence, the surface is flattened. In this embodiment, the second light-shielding layer 702 is made of a light-reflective metal material such as aluminum, and is provided in the peripheral region SR so as to shield light by reflecting the red component light R incident on the counter substrate 1 through the polarizing plate 542R and transmitted through the liquid crystal layer 31. That is, the second light-shielding layer 702 is formed to surround the periphery of the pixel region PR in a frame-like form. Specifically, referring to FIG. 3, the second light-shielding layer 702 is formed in the peripheral region SR to correspond to the regions SR2 and SR3 except the seal region SR1, to prevent light from being incident on the peripheral circuits (not shown) provided in the peripheral region SR. The second light-shielding layer 702 is formed, for example, by depositing a metal film using a metal material, and then performing pattern processing by lithography technology.

In the liquid crystal panel 601, referring to FIG. 3, the liquid crystal layer 31 is interposed between the counter substrate 1 and the TFT array substrate 11. The liquid crystal layer 31 is made of, for example, a liquid crystal material having a negative anisotropy of dielectric constant, in which $\Delta n$ is 0.10 or larger. The liquid crystal layer 31 is provided in a vertically aligned condition between the TFT array substrate 11 and the counter substrate 1 such that major axes of liquid crystal molecules are vertically directed with respect to the mutually facing surfaces of the TFT array substrate 11 and the counter substrate 1. The liquid crystal layer 31 is aligned by alignment films (not shown) which are made of an inorganic material such as a silicon dioxide film, and are formed on mutually facing surfaces of the TFT array substrate 11 and the counter substrate 1.

In the pixel region PR, the liquid crystal layer 31 is configured such that the alignment condition thereof is changed in accordance with a voltage applied to the liquid crystal layer 31 between the pixel electrode 111 of the TFT array substrate 11 and the counter electrode 23 of the counter substrate 1, and an optical characteristic for transmitting light is modulated. Specifically, in the liquid crystal layer 31 aligned such that the major axes of the liquid crystal molecules are vertically directed with respect to the mutually facing surfaces of the TFT array substrate 11 and the counter substrate 1, when a voltage is applied thereto, the direction of the major axes of the liquid crystal molecules is changed to become horizontally along the mutually facing surfaces of the TFT array substrate 11 and the counter substrate 1. That is, in the pixel region PR, the liquid crystal layer 31 is driven so as to be changed between a vertical alignment condition and a non-vertical alignment condition in accordance with the voltage applied.

Meanwhile, in the peripheral region SR, when a voltage is applied to the liquid crystal layer 31 between the counter electrode 23 and the peripheral electrode 111a, the impurity ions contained in the liquid crystal layer 31 electrically adhere to the peripheral region SR, and accordingly, the impurity ions are prevented from being dispersed into the pixel region PR. Therefore, in the peripheral region SR, the liquid crystal layer 31 is driven to hold the non-vertical alignment condition when a voltage is applied.

In the liquid crystal panel 601, the seal member 51 bonds the counter substrate 1 and the TFT array substrate 11 together in the peripheral region SR. In this embodiment, the seal member 51 is made of a photo-curable seal material which is curable by irradiation with light. Specifically, the seal member 51 uses, for example, UV-curable resin, which is curable by irradiation with UV, as the photo-curable material, and is formed by irradiating the photo-curable material with UV to cure the material.

The light-shielding plate 602 of the first LCD portion 541R is described.

Referring to FIG. 2, the light-shielding plate 602 partially surrounds the peripheral region SR of the liquid crystal panel 601. That is, the light-shielding plate 602 is formed to surround the periphery of the pixel region PR in a frame-like form. Referring to FIG. 3, the light-shielding plate 602 is provided outside the liquid crystal panel 601. The light-shielding plate 602 shields light by reflecting light transmitted through the polarizing plate 542R to the polarizing plate 542R. The light-shielding plate 602 is provided closer to the counter substrate 1 than the liquid crystal layer 31 so that polarized light transmitted through the polarizing plate 542R is not incident on the liquid crystal layer 31, but is reflected to the polarizing plate 542R. That is, the light-shielding plate 602 reflects the light transmitted through the polarizing plate 542R to the polarizing plate 542R before the light is incident on the liquid crystal layer 31. For example, the light-shielding plate 602 is made of a metal material such as aluminum, and is provided at the frame 603. The light-shielding plate 602 covers at least a region of the peripheral region SR except the region covered with the first light-shielding layer 701. Though described later in detail, the light-shielding plate 602 is provided after the seal member 51 is formed by irradiating the photo-curable material with light.

In this embodiment, referring to FIG. 3, the light-shielding plate 602 includes a first light-shielding member 602a and a second light-shielding member 602b.

In the light-shielding plate 602, referring to FIG. 3, the first light-shielding member 602a is a plate-like member, which is arranged to face the liquid crystal panel 601. The first light-shielding member 602a is arranged to face the counter substrate 1 with the first dustproof glass substrate 621 interposed therebetween. The first light-shielding member 602a is arranged between the polarizing plate 542R and the liquid crystal layer 31. Referring to FIG. 3, the first light-shielding member 602a is provided in the peripheral region SR to cover at least the regions SR1 and SR3 except the region SR2 covered with the first light-shielding layer 701. The first light-shielding member 602a is located farther from the liquid crystal layer 31 than the first light-shielding layer 701 is. Also, referring to FIG. 3, the first light-shielding member 602a is provided at a distance from the boundary between the pixel region PR and the peripheral region SR of the liquid crystal panel 601 toward the peripheral region SR. Specifically, a distance D2 from an end portion of the first light-shielding member 602a near the pixel region PR of the liquid crystal panel 601 to the boundary between the pixel region PR and the peripheral region SR of the liquid crystal panel 601 is determined to be 120 μm or larger. That is, the first light-shielding member 602a extends to cover a part of the pixel adjacent region SR2 in the peripheral region SR in a superposed manner at a predetermined distance D2 apart from the end portion of the pixel region PR.

In the light-shielding plate 602, referring to FIG. 3, the second light-shielding member 602b is a plate-like member, which faces a side surface of the liquid crystal panel 601, and is fixed to the frame 603. Specifically, the second light-shielding member 602b is vertically arranged from the first light-shielding member 602a which faces the liquid crystal panel 601. A surface of the second light-shielding member 602b facing the side surface of the liquid crystal panel 601 is fixed to the frame 603 by bonding with, for example, an adhesive.

In the FPC substrate 611 of the first LCD portion 541R, referring to FIG. 2, a wiring circuit is printed on a film-like substrate made of insulating resin. As described above, one end of the FPC substrate 611 is connected to the terminal portion 61 of the liquid crystal panel 601, and another end thereof is connected to devices, such as a power supply (not shown) and a control circuit (not shown). The FPC substrate 611 transmits an electric signal to the peripheral circuits.

Referring to FIG. 3, the first dustproof glass substrate 621 of the first LCD portion 541R faces the liquid crystal panel 601. The first dustproof glass substrate 621 faces the surface of the counter substrate 1 of the liquid crystal panel 601 opposite to the surface thereof facing the TFT array substrate 11. That is, the first dustproof glass substrate 621 is arranged between the counter substrate 1 and the polarizing plate 542R. The first dustproof glass substrate 621 is made of, for example, a light-transmissive material such as glass. The thickness of the first dustproof glass substrate 321 is determined such that if dust adheres on a surface of the first dustproof glass substrate 621 opposite to a surface thereof provided with the liquid crystal panel 601, an image of the dust is defocused when an image is displayed.

Referring to FIG. 3, the second dustproof glass substrate 622 of the first LCD portion 541R faces the liquid crystal panel 601. Specifically, the second dustproof glass substrate 622 faces the surface of the TFT array substrate 11 of the liquid crystal panel 601 opposite to the surface thereof facing the counter substrate 1. The second dustproof glass substrate 622 is made of, for example, a light-transmissive material such as glass. The thickness of the second dustproof glass substrate 622 is determined such that if dust adheres on a surface of the second dustproof glass substrate 622 opposite to a surface thereof provided with the liquid crystal panel 601, an image of the dust is defocused when an image is displayed.

Referring to FIG. 3, the frame 603 of the first LCD portion 541R has a housing space to house and support the liquid crystal panel 601 provided with the first and second dustproof glass substrates 621 and 622 on both sides thereof. Also, referring to FIG. 3, the frame 603 has an aperture AP that allows the red component light R emitted from the counter substrate 1 of the liquid crystal panel 601 and transmitted through the TFT array substrate 11 to be transmitted therethrough in the pixel region PR. Referring to FIG. 1, the red component light R transmitted through the aperture AP is emitted to the dichroic prism 561 through the polarizing plate 543R.

Manufacturing Method

Hereinafter, a manufacturing method of the above-described LCD portion 541R, in particular, manufacturing steps including a step of forming the seal member 51 and a subsequent step are described.

Figure 7A:
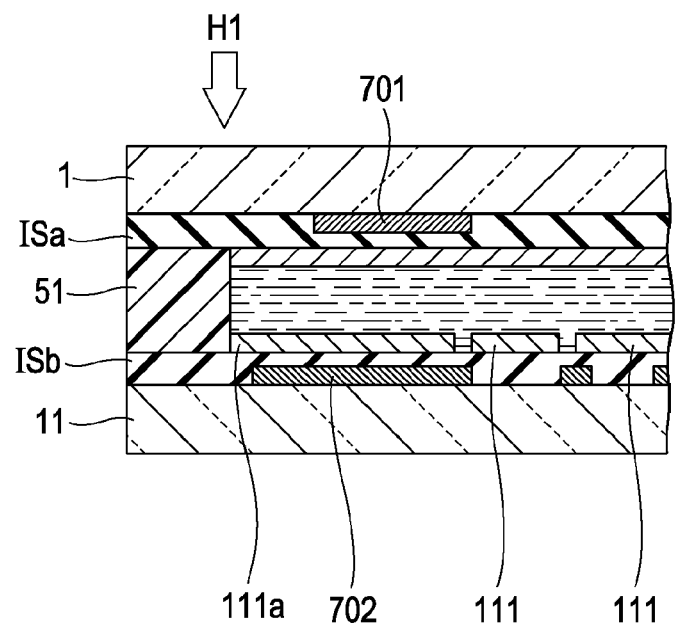
FIGS. 7A and 7B are cross sections showing manufacturing steps for manufacturing the first liquid crystal display portion including a step of forming a seal member and a subsequent step, according to the first embodiment of the present invention.
Figure 7B:
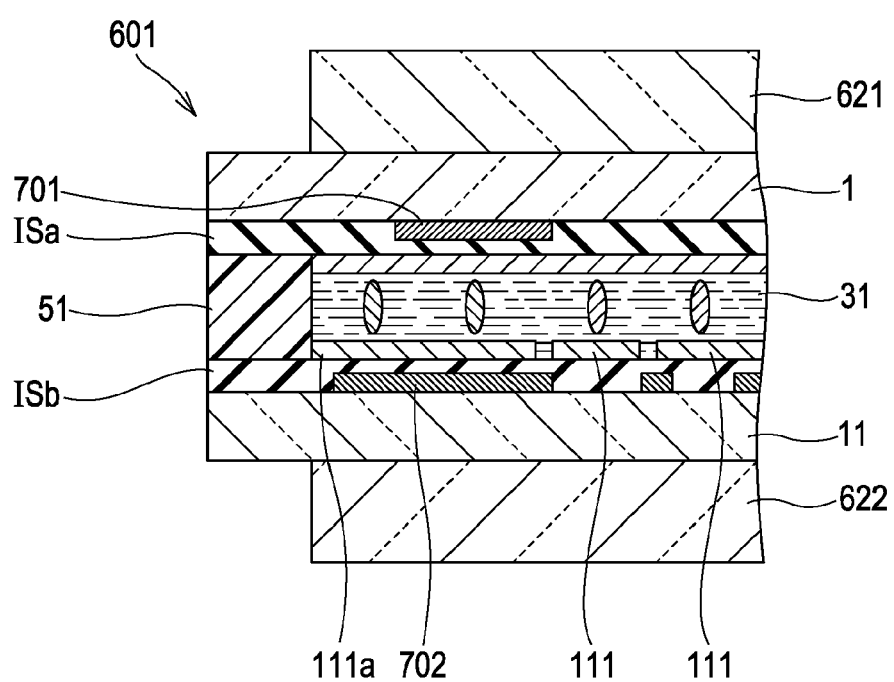

FIGS. 7A and 7B are cross sections showing manufacturing steps for manufacturing the first LCD portion 541R including a step of forming the seal member 51 and a subsequent step, according to the first embodiment of the present invention. FIGS. 7A and 7B are cross sections showing steps in that order.

Referring to FIG. 7A, the photo-curable material provided at a formation region of the seal member 51 is irradiated with light, to form the seal member 51.

Referring to FIG. 7A, the counter substrate 1 and the TFT array substrate 11 having the respective components are arranged to face each other, and bonded with a photo-curable adhesive material. Then, the photo-curable adhesive material provided in the formation region of the seal member 51 is irradiated with light H1. Specifically, referring to FIG. 7A, the seal member 51 is formed by irradiating the photo-curable adhesive material provided in the formation region of the seal member 51 with the light H1, from the surface of the counter substrate 1 opposite to the surface thereof provided with the liquid crystal layer 31. Then, injection of liquid crystal and other steps are performed, and thus the liquid crystal panel 601 is completed.

Referring to FIG. 7B, the first and second dustproof glass substrates 621 and 622 are arranged.

Referring to FIG. 7B, the first dustproof glass substrate 621 is arranged to face the surface of the counter substrate 1 of the liquid crystal panel 601 opposite to the surface thereof facing the TFT array substrate 11. Also, the second dustproof glass substrate 622 is arranged to face the surface of the TFT array substrate 11 of the liquid crystal panel 601 opposite to the surface thereof facing the counter substrate 1.

Then, referring to FIG. 3, the light-shielding plate 602 and the frame 603 are arranged.

Referring to FIG. 3, the liquid crystal panel 601 with the first and second dustproof glass substrates 621 and 622 arranged on both sides thereof is housed in and supported by the housing space of the frame 603. Referring to FIG. 3, the light-shielding plate 602 is arranged to partially surround the peripheral region SR of the liquid crystal panel 601. Specifically, the light-shielding plate 602 is arranged such that the first light-shielding member 602a of the light-shielding plate 602 faces the counter substrate 1 through the first dustproof glass substrate 621.

Operation

Hereinafter, an operation of the above-described first LCD portion 541R for displaying an image is described.

Figure 8:
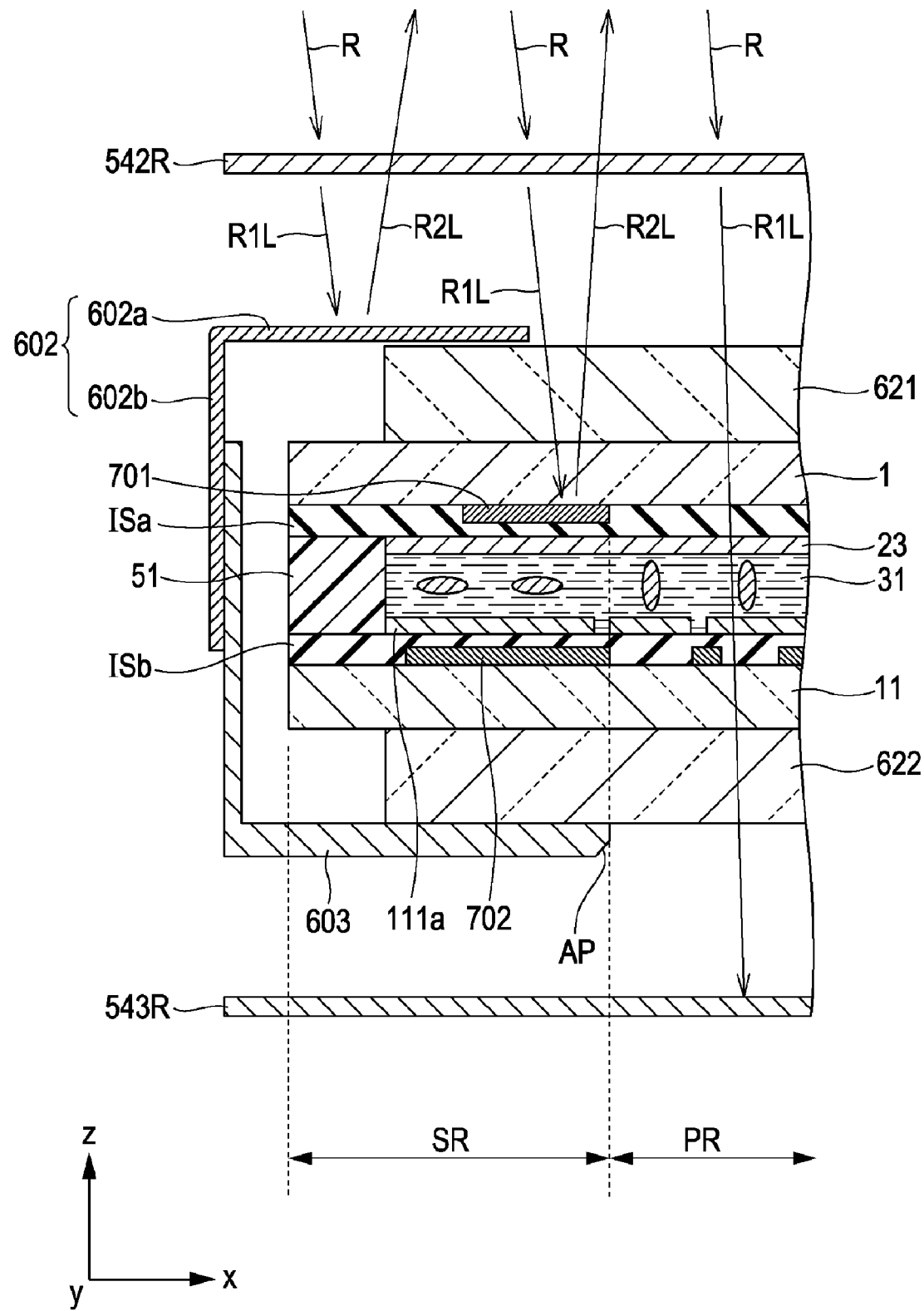
FIG. 8 is a cross section showing an operation with the first liquid crystal display portion for image display according to the first embodiment of the present invention.
Figure 9:
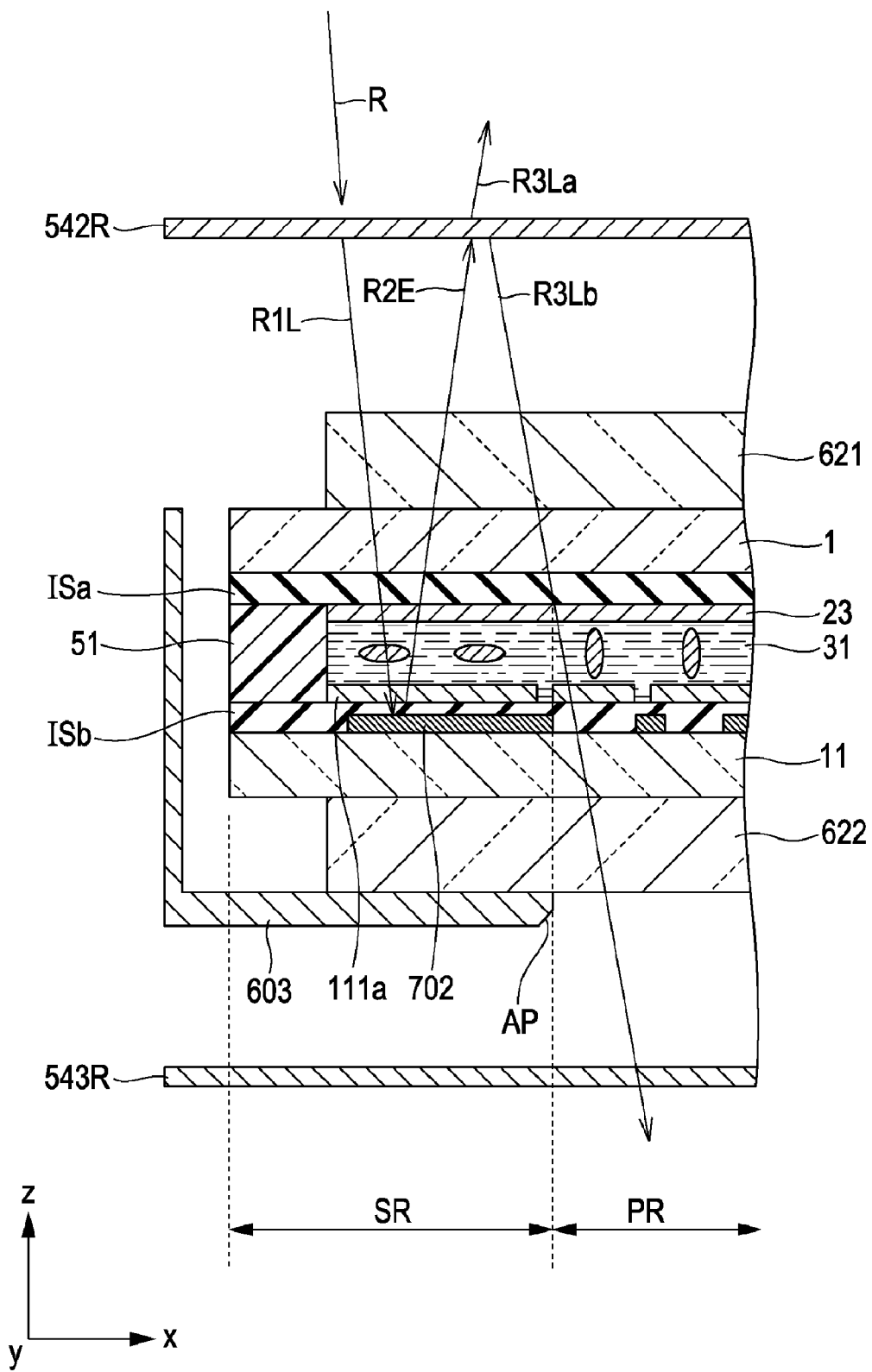
FIG. 9 is a cross section showing an operation with the first liquid crystal display portion according to the first embodiment of the present invention when a light-shielding plate and a first light-shielding layer are not provided.

FIG. 8 is a cross section showing an operation with the first LCD portion 541R for displaying an image according to the first embodiment of the present invention. FIG. 9 is a cross section showing an operation with the first LCD portion 541R for displaying an image according to the first embodiment of the present invention when the light-shielding plate 602 and the first light-shielding layer 701 are not provided.

As described above, to display an image, the liquid crystal layer 31 is driven in the pixel region PR so as to be changed between the vertical alignment condition and the non-vertical alignment condition in accordance with the applied voltage. In contrast, in the peripheral region SR, in order to cause the impurity ions contained in the liquid crystal layer 31 to adhere to the peripheral region SR and thus to prevent the impurity ions from being dispersed into the pixel region PR, the liquid crystal layer 31 is driven such that a voltage is constantly applied to the liquid crystal layer 31 between the counter electrode 23 and the peripheral electrode 111a, to hold the non-vertical alignment condition.

Therefore, referring to FIG. 8, in the first LCD portion 541R of this embodiment, the red component light R reflected by the second reflection mirror 512 in a partially polarized manner is emitted to the polarizing plate 542R, and then is transmitted through the polarizing plate 542R. Accordingly, the red component light R becomes linearly polarized light R1L.

When no voltage is applied to the liquid crystal layer 31 in the pixel region PR, referring to FIG. 8, the linearly polarized light R1L is transmitted through the liquid crystal layer 31 with the linearly polarized condition held unchanged, and reaches the polarizing plate 543R provided at the exit side. Since the polarizing plate 543R provided at the exit side is arranged in a cross nicol manner, the linearly polarized light R1L is not transmitted through the polarized plate 543R. Hence, a black display appears in the pixel region PR.

While a voltage is applied to the liquid crystal layer 31 in the peripheral region SR, referring to FIG. 8, the linearly polarized light R1L is not incident on the liquid crystal layer 31, and is reflected to the polarizing plate 542R by the first light-shielding member 602a of the light-shielding plate 602 and the first light-shielding layer 701. Referring to FIG. 8, since the linearly polarized light R1L is not transmitted through the liquid crystal layer 31, the linearly polarized light R1L is reflected to the polarizing plate 542R with the linearly polarized condition held unchanged. Accordingly, reflected light R2L reflected to the polarizing plate 542R at the incident side by the first light-shielding member 602a and the first light-shielding layer 701 is not reflected by the polarizing plate 542R, which is the reflection polarizing plate provided at the incident side, and is transmitted through the polarizing plate 542R. Hence, since the polarized light R2L reflected to the polarizing plate 542R at the incident side is not reflected to the pixel region PR by the polarizing plate 542R which is the reflection polarizing plate, "stray light" is not mixed into the black display appearing in the pixel region PR.

In contrast, referring to FIG. 9, when the light-shielding plate 602 and the first light-shielding layer 701 are not provided for the first LCD 541R of this embodiment, unlike the first LCD portion 541R of this embodiment, the linearly polarized light R1L is transmitted through the liquid crystal layer 31, reaches the second light-shielding layer 702 provided at the TFT array substrate 11, is reflected thereby, is transmitted again through the liquid crystal layer 31, and advances toward the polarizing plate 542R at the incident side, in the peripheral region SR. At this time, since a voltage is applied to the liquid crystal layer 31 in the peripheral region SR, polarized light R2E reflected to the polarizing plate 542R at the incident side by the second light-shielding layer 702 advances to the polarizing plate 542R at the incident side, not as linearly polarized light, but as elliptically polarized light. Hence, the polarized light R2E reflected to the polarizing plate 542R at the incident side is partially reflected to the pixel region PR as linearly polarized light R3Lb by the polarizing plate 542R which is the reflection polarizing plate. The polarizing plate 542R which is the reflection polarizing plate transmits linearly polarized light R3La in the same direction as that of the initially transmitted, linearly polarized light R1L, from among the elliptically polarized light R2E reflected by the second light-shielding layer 702. The polarizing plate 542R which is the reflection polarizing plate reflects the polarized light R3Lb as linearly polarized light with an orientation orthogonal to that of the initially transmitted, linearly polarized light R1L. Therefore, since the linearly polarized light R3Lb is transmitted through the pixel region PR, "stray light" appears.

Figure 10:
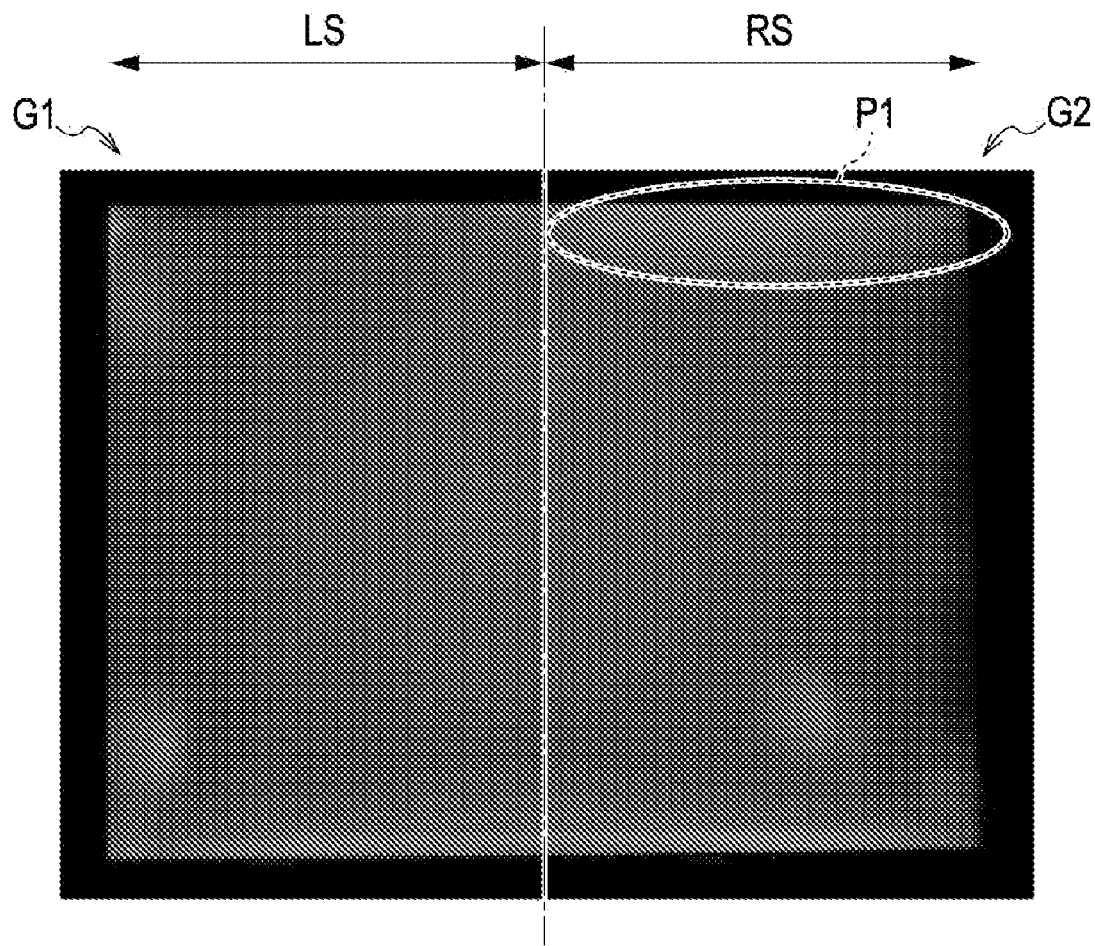
FIG. 10 is an illustration showing an image displayed on the first liquid crystal display portion according to the first embodiment of the present invention, and an image displayed on the first liquid crystal display portion of the first embodiment when the light-shielding plate and the first light-shielding layer are not provided.

FIG. 10 is an illustration showing an image displayed on the first LCD portion 541R according to the first embodiment of the present invention, and an image displayed on the first LCD portion 541R of the first embodiment when the light-shielding plate 602 and the first light-shielding layer 701 are not provided. Referring to FIG. 10, a left portion LS is an image G1 displayed on the first LCD portion 541R of the first embodiment, and a right portion RS is an image G2 displayed on the first LCD portion 541R of the first embodiment when the light-shielding plate 602 and the first light-shielding layer 701 are not provided.

Referring to FIG. 10, "stray light" is not mixed into the image G1 displayed on the first LCD portion 541R of this embodiment. In contrast, a stripe-like gradation appears in a portion P1 indicated by a dotted line in the image G2 displayed on the first LCD portion 541R of this embodiment when the light-shielding plate 602 and the first light-shielding layer 701 are not provided, and hence, "stray light" is mixed into the image G2.

In this embodiment, the reflection polarizing plate is used as the polarizing plate 542R arranged at the light-incident side of the liquid crystal panel 601. Specifically, the reflection polarizing plate is used, which reflects polarized light with a polarized component except a linearly polarized component from among incident light R, to transmit the linearly polarized light. In the peripheral region SR, the light-shielding plate 602 and the first light-shielding layer 701 are provided closer to the counter substrate 1 than the liquid crystal layer 31 so that the linearly polarized light R1L transmitted through the polarizing plate 542R is not incident on the liquid crystal layer 31, but is reflected to the polarizing plate 542R. Accordingly, as described above, "stray light" can be prevented from being mixed into a displayed image. In addition, undesirable light is not incident on the liquid crystal layer 31, and hence, light resistance is increased Accordingly, with the present embodiment, image quality of a displayed image can be increased.

Also, in this embodiment, as described above, the first light-shielding layer 701 is formed in the peripheral region SR to cover the pixel adjacent region SR2, which is a partial region adjacent to the pixel region PR except the seal region SR1 corresponding to the area where the seal member 51 is arranged. That is, only the first light-shielding layer 701 is formed as a light-shielding member in the region except the seal region SR1 in the peripheral region SR of the liquid crystal panel 601. In addition, the first light-shielding layer 701 is formed in the peripheral region SR, so as to cover the pixel adjacent region SR2, which is the region at the distance D1 of 100 μm or larger from the end portion of the seal region SR1 toward the pixel region PR. Accordingly, with this embodiment, since the member that shields incident light from the counter substrate 1 in the seal region SR1 is not formed near the seal region SR1, the photo-curable material provided in the seal region SR1 can be properly irradiated with light.

Figure 11:
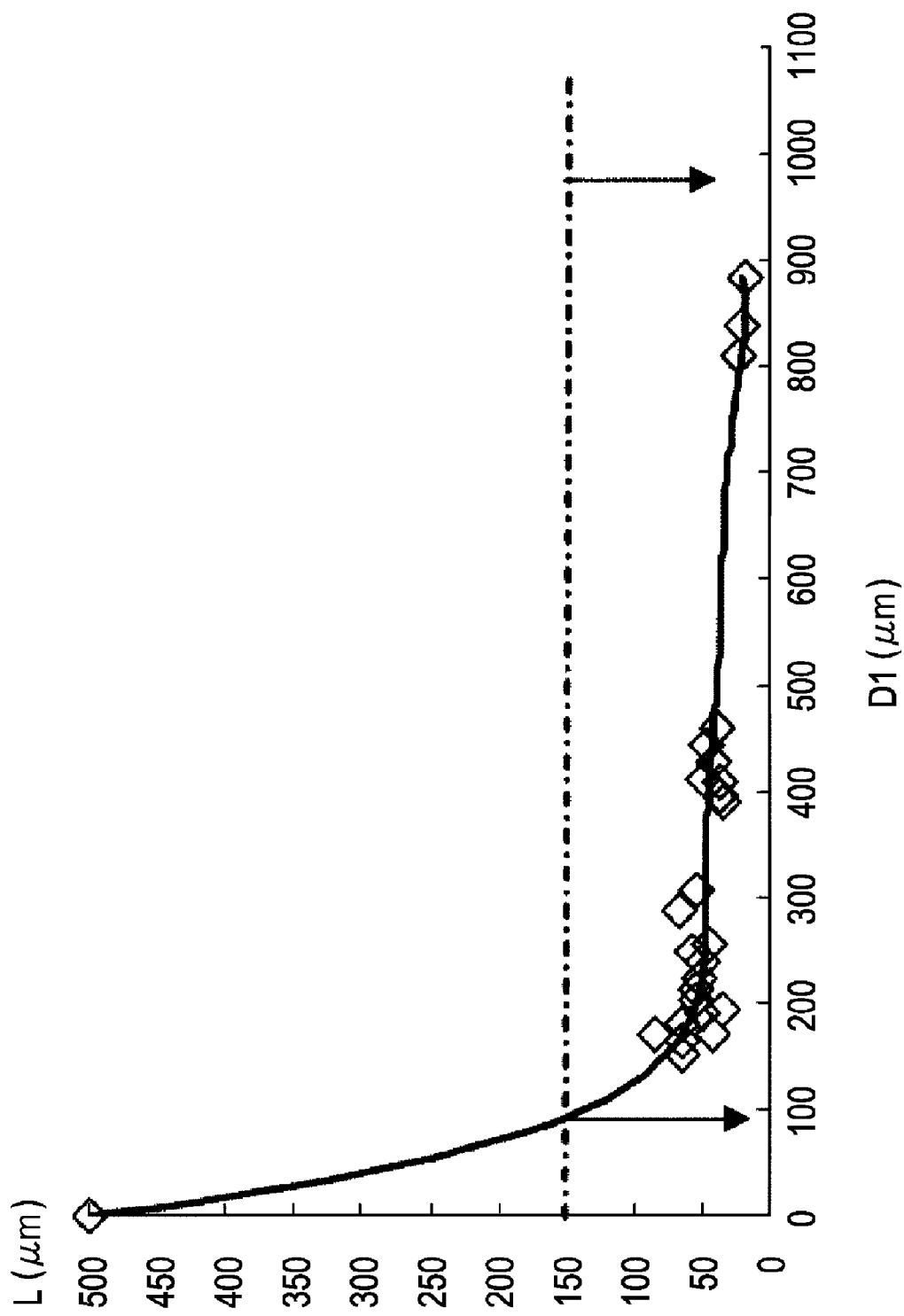
FIG. 11 is an illustration showing a relationship between a distance from an end portion of a seal region to the first light-shielding layer, and a cure extent of the seal member, in a peripheral region according to the first embodiment of the present invention.

FIG. 11 is an illustration showing a relationship between the distance from the end portion of the seal region SR1 to the first light-shielding layer 701, and a cure extent of the seal member 51, in the peripheral region SR according to the first embodiment of the present invention. In FIG. 11, a seal-edge liquid-crystal-alignment defect width L (μm) represents a cure extent that is used as an index representing the degree of curing of the seal member 51. Hence, FIG. 11 shows the relationship between the distance D1 from the end portion of the seal region SR1 to the first light-shielding layer 701, and the seal-edge liquid-crystal-alignment defect width L (μm). In particular, the seal-edge liquid-crystal-alignment defect width L (μm) is produced because an uncured component of the seal member 51 is eluted to the liquid crystal layer 31, and an alignment property of liquid crystal is deteriorated. The width L is increased in accordance with an eluted amount of the uncured component. Hence, the width L can be used as an index of the degree of curing.

When the seal-edge liquid-crystal-alignment defect width L (μm) is 150 μm or smaller, the eluted amount of the uncured component is small, and reliability of the liquid crystal panel is secured, thereby being desirable. In contrast, when the width L exceeds 150 μm, the eluted amount of the uncured component is large, and it has been recognized that the reliability of the liquid crystal panel is seriously deteriorated, thereby being undesirable. Therefore, the seal-edge liquid-crystal-alignment defect width L (μm) should be 150 μm or smaller.

Thus, as found through the result in FIG. 11, the distance D1 from the end portion of the seal region SR1 to the first light-shielding layer 701 may be desirably 100 μm or larger, more particularly, 200 μm or larger. Accordingly, the uncured component can be prevented from being mixed into the liquid crystal layer 31 from the seal material due to underexposure of the seal material. Thus, the alignment defect of the liquid crystal layer 31 at a seal edge, and the deterioration in the reliability of the liquid crystal layer 31 due to mixing of impurity can be prevented.

Also, with the above configuration, since the seal material may use the photo-curable material instead of a thermosetting material, a problem caused by the use of the thermosetting material can be prevented. In particular, when the thermosetting material is used, the liquid crystal layer 31 may be contaminated by outgas generated when the thermosetting material is cured, and the reliability of the liquid crystal layer 31 may be deteriorated. However, with this embodiment, since the photo-curable material may be used, such a problem can be eliminated.

Figure 12:
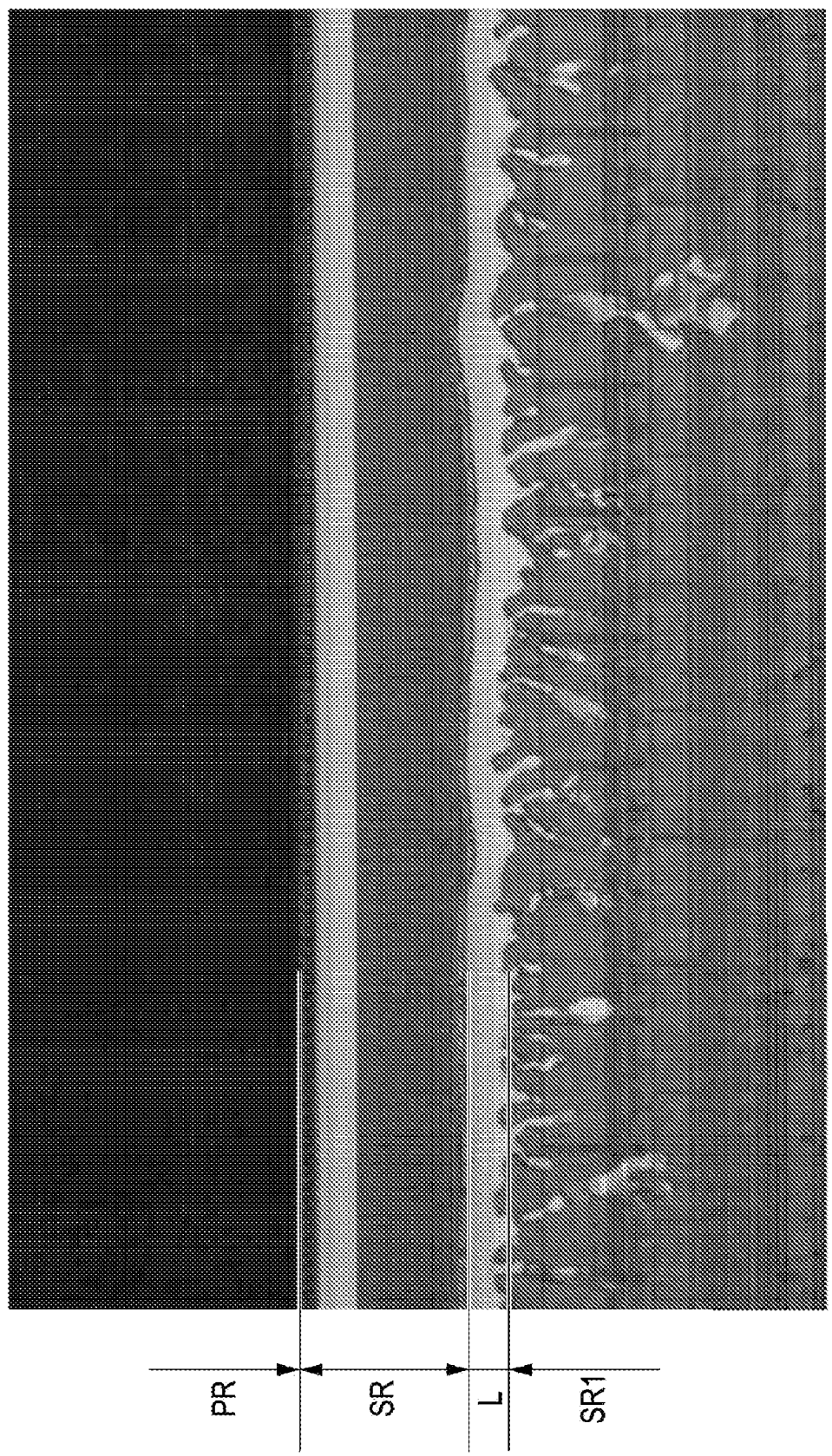
FIG. 12 is an illustration showing a photomicrograph of a sample fabricated to obtain a relationship between a distance from the end portion of the seal region to the first light-shielding layer, and a seal-edge liquid-crystal-alignment defect width (μm) according to the first embodiment of the present invention.

FIG. 12 is an illustration showing a photomicrograph of a sample fabricated to obtain the relationship between the distance D1 from the end portion of the seal region SR1 to the first light-shielding layer 701, and the seal-edge liquid-crystal-alignment defect width L (μm) according to the first embodiment of the present invention.

For each of samples shown in FIG. 12, the distance D1 from the end portion of the seal region SR1 to the first light-shielding layer 701, and the seal-edge liquid-crystal-alignment defect width L are measured with a reflection polarizing microscope and a microgauge.

Herein, determination whether the liquid crystal layer 31 has an alignment defect or not is made based on an even light intensity at a center portion of the pixel region PR, and a light intensity in the vicinity of the seal region SR1 of the peripheral region SR. Specifically, when a light intensity of light reflected by the center portion of the pixel region PR is equivalent to a light intensity of light reflected by the vicinity of the seal region SR1 of the peripheral region SR, it is determined that an alignment defect is not present. In contrast, when a light intensity at the center portion of the pixel region PR is different from a light intensity in the vicinity of the seal region SR1 of the peripheral region SR, it is determined that an alignment defect is present. Referring to FIG. 12, a width from the boundary of the regions having the different light intensities near the pixel region PR and farthest from the seal region SR1, to an average boundary of the seal member near the pixel region PR is measured as the seal-edge liquid-crystal-alignment defect width L.

In this embodiment, the light-shielding plate 602 is provided after the seal member 51 is formed by curing the photo-curable seal material. The light-shielding plate 602 covers at least the region of the peripheral region SR except the region covered with the first light-shielding layer 701. Also, the light-shielding plate 602 is provided farther from the liquid crystal layer 31 than the first light-shielding layer 701 is. Accordingly, with this embodiment, the first light-shielding layer 701 is formed in the peripheral region SR to cover the pixel adjacent region SR2 which is the region apart by the distance D1 of 100 μm or larger from the end portion of the seal region SR1 toward the pixel region PR. Since the light-shielding plate 602 shields incident light on the region including the region SR3 where the first light-shielding layer 701 is not provided. Thus, "stray light" can be prevented from being mixed into a displayed image.

In this embodiment, while the light-shielding plate 602 and the first light-shielding layer 701 are provided in the peripheral region SR in a superposed manner, it is not limited thereto. The light-shielding plate 602 and the first light-shielding layer 701 may be provided with a gap therebetween in a plane direction of the peripheral region SR so that light is incident on the liquid crystal layer 31. Since the light-shielding plate 602 and the first light-shielding layer 701 are provided with the gap therebetween in the plane direction of the peripheral region SR so that the light is incident on the liquid crystal layer 31, an eclipse can be prevented.

Figure 13:
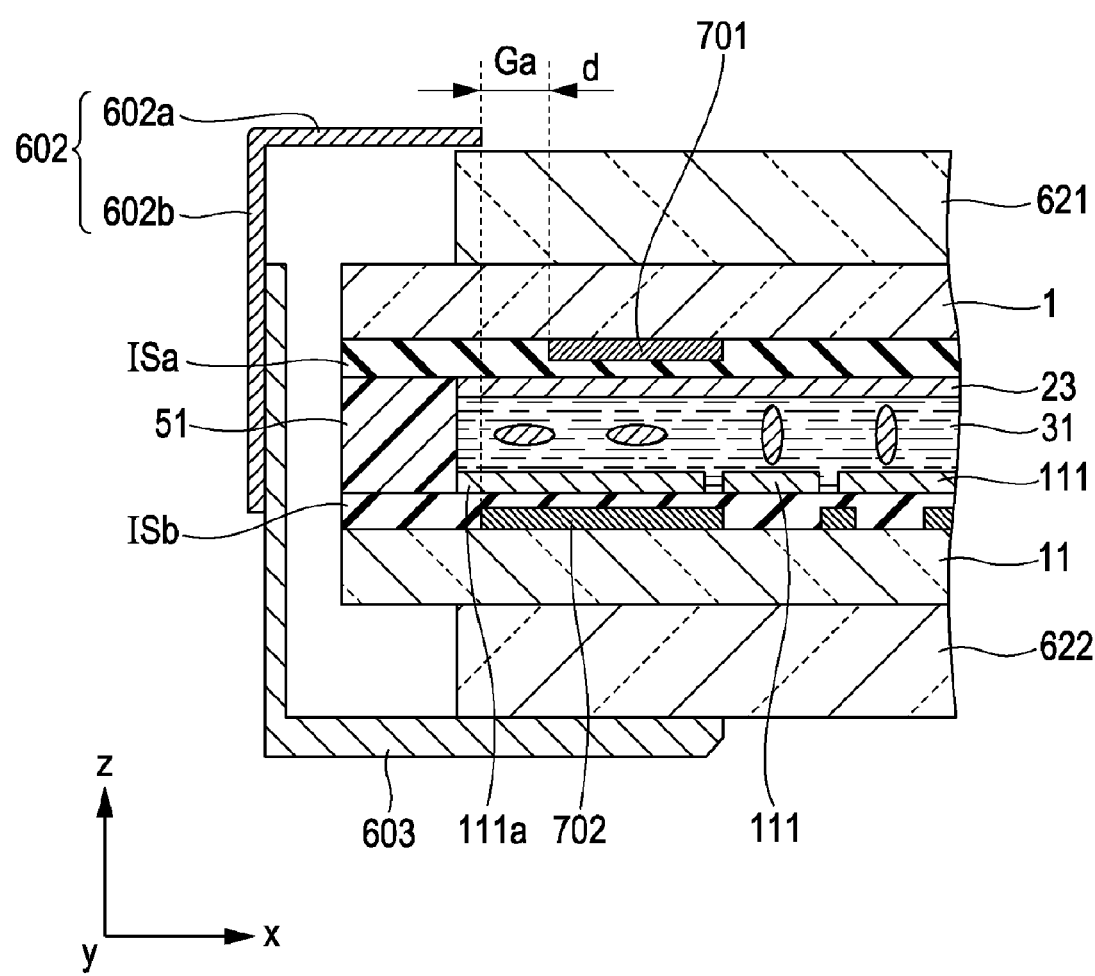
FIG. 13 is a cross section showing the liquid crystal panel when a gap is provided between the light-shielding plate and the first light-shielding layer in a plane direction of a peripheral region according to the first embodiment of the present invention.

FIG. 13 is a cross section showing the liquid crystal panel 601 when a gap is provided between the light-shielding plate 602 and the first light-shielding layer 701 in the plane direction of the peripheral region SR according to the first embodiment of the present invention.

Referring to FIG. 13, when the light-shielding plate 602 and the first light-shielding layer 701 are provided not in a superposed manner in the plane direction of the peripheral region SR, but are provided with a gap Ga of a predetermined distance d between the light-shielding plate 602 and the first light-shielding layer 701 so that the light is incident on the liquid crystal layer 31 in the peripheral region SR, a desirable result can be obtained.

Figure 14:
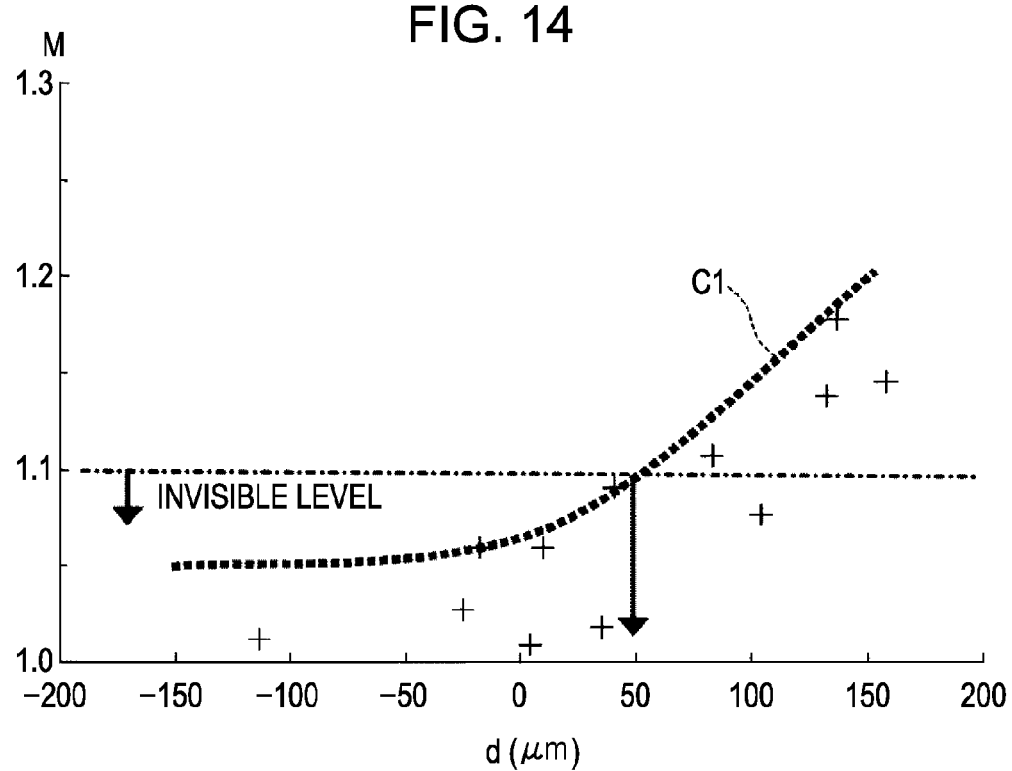
FIG. 14 is an illustration showing a relationship between a distance from the light-shielding plate to the first light-shielding layer in the plane direction of the peripheral region, and a stray light amount, according to the first embodiment of the present invention.

FIG. 14 is an illustration showing a relationship between the distance d of the gap Ga from the light-shielding plate 602 to the first light-shielding layer 701 in the plane direction of the peripheral region SR, and a stray light amount M, according to the first embodiment of the present invention. In FIG. 14, the vertical axis represents the stray light amount M, and the horizontal axis represents the above-mentioned distance d. A negative value in the horizontal axis is a distance in which the light-shielding plate 602 and the first light-shielding layer 701 are superposed in the plane direction of the peripheral region SR. Referring to FIG. 14, a curve C1 indicated by a broken line is obtained by connecting maximum values of the distances d.

A plurality of samples of liquid crystal panels 601 are prepared, each of which has a different distance d of the gap Ga provided between the first light-shielding member 602a of the light-shielding plate 602 and the first light-shielding layer 701 in the plane direction of the peripheral region SR. The stray light amount M is measured for each of the samples, and the result is shown.

In particular, each sample of the liquid crystal panel 601 was set in the liquid crystal display apparatus 500, an image was projected in a dark room, and an illuminance CS at a center portion of the image and an illuminance MS at a portion with stray light were measured. The measurement was performed such that the second LCD portion 541G of the liquid crystal display apparatus 500 shown in FIG. 1 is replaced with the liquid crystal panel 601 fabricated as the sample as described above, and the pixel regions PR of the liquid crystal panels 601 of the first and third LCD portions 541R and 541B are shielded with light-shielding plates so that light is not emitted on the first and third LCD portions 541R and 541B. Then, the stray light amount M was calculated on the basis of Expression (1) as follows:

$$M = MS/CS * HK \quad (1)$$

where HK is a correction factor to correct an in-plane illuminance distribution of an optical system, the correction factor which is obtained by using an illumination ratio of a sample that does not cause stray light (a ratio (A/B) of an illuminance A measured at a center portion of a pixel region of the sample that does not cause stray light to an illuminance B of the sample that does not cause stray light at a measurement position for an illuminance MS in a stray-light generation portion of a sample that causes stray light).

It was determined that the "stray light" is visible in the displayed image when the stray light amount M exceeds 1.1, and the "stray light" is invisible in the displayed image when the stray light amount M is 1.1 or smaller, by sensory evaluation.

Accordingly, as found through the result shown in FIG. 14, the light-shielding plate 602 and the first light-shielding layer 701 may be desirably provided in the peripheral region SR with the gap by the distance d of 50 μm or smaller.

Meanwhile, as described in the above embodiment, when the light-shielding plate 602 and the first light-shielding layer 701 are provided in the peripheral region SR in a superposed manner, the distance D2 from the end portion of the first light-shielding member 602a of the light-shielding plate 602 located near the pixel region PR of the liquid crystal panel 601 to the boundary between the pixel region PR and the peripheral region SR of the liquid crystal panel 601 may be desirably a predetermined distance.

Figure 15:
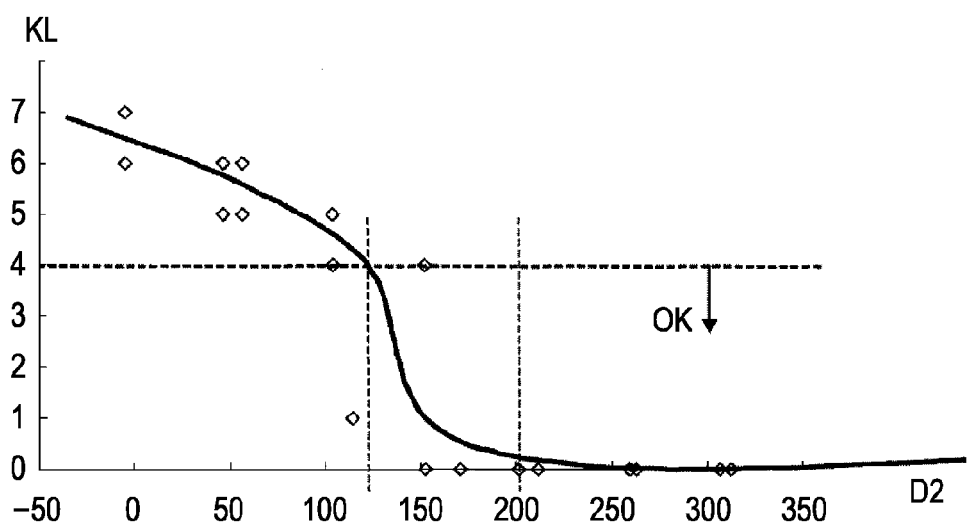
FIG. 15 is an illustration showing a relationship between a distance from a first light-shielding member to a boundary of a pixel region, and an "eclipse" level, according to the first embodiment of the present invention.

FIG. 15 is an illustration showing a relationship between the distance D2 from the first light-shielding member 602a and the boundary of the pixel region PR, and an "eclipse" level, according to the first embodiment of the present invention. In FIG. 15, the vertical axis represents an "eclipse" level KL, and the horizontal axis represents the above-mentioned distance D2. A negative value in the horizontal axis is a distance in which the first light-shielding member 602a of the light-shielding plate 602 is superposed toward the pixel region PR in the plane direction. That is, a distance from the boundary between the pixel region PR and the peripheral region SR to the center of the pixel region PR is negative, and a distance to a peripheral edge of the peripheral region SR is positive.

A plurality of samples are prepared, each of which has a different distance D2, and the "eclipse" level KL is measured for each of the samples. Then, the results are shown. A method of measuring the "eclipse" level KL is based on displaying of an image similarly to the case of the stray light amount M. The displayed image is measured by sensory evaluation. When the "eclipse" is recognized and displayed as a noticeable eclipse or a serious eclipse, it is determined that the "eclipse" is generated, by the sensory evaluation. In this embodiment, the evaluation was performed so as to classify results into eight levels. When the result is worse than level 4, the eclipse is not permissible in view of image quality, and hence, a permissible range is determined from level 0 to level 4.

Determination Criterion for Eclipse Level
  Level 0: eclipse is invisible
  Level 1: it is difficult to recognize eclipse
  Level 2: eclipse is recognizable when zoom is changed
  Level 3: slight eclipse is recognizable without zoom change
  Level 4: eclipse is markedly recognizable
  Level 5: Eclipse is markedly recognizable as noticeable or serious eclipse
  Level 6: eclipse is vividly recognizable
  Level 7: eclipse is extremely vividly recognizable As found through the result shown in FIG. 15, to hold the "eclipse" level KL within a range of from level 0 to level 4, the distance D2 from the end portion of the first light-shielding member 602a located near the pixel region PR to the boundary between the pixel region PR and the peripheral region SR may be desirably 120 μm or larger, more particularly, 200 μm or larger.

Second Embodiment

Figure 16:
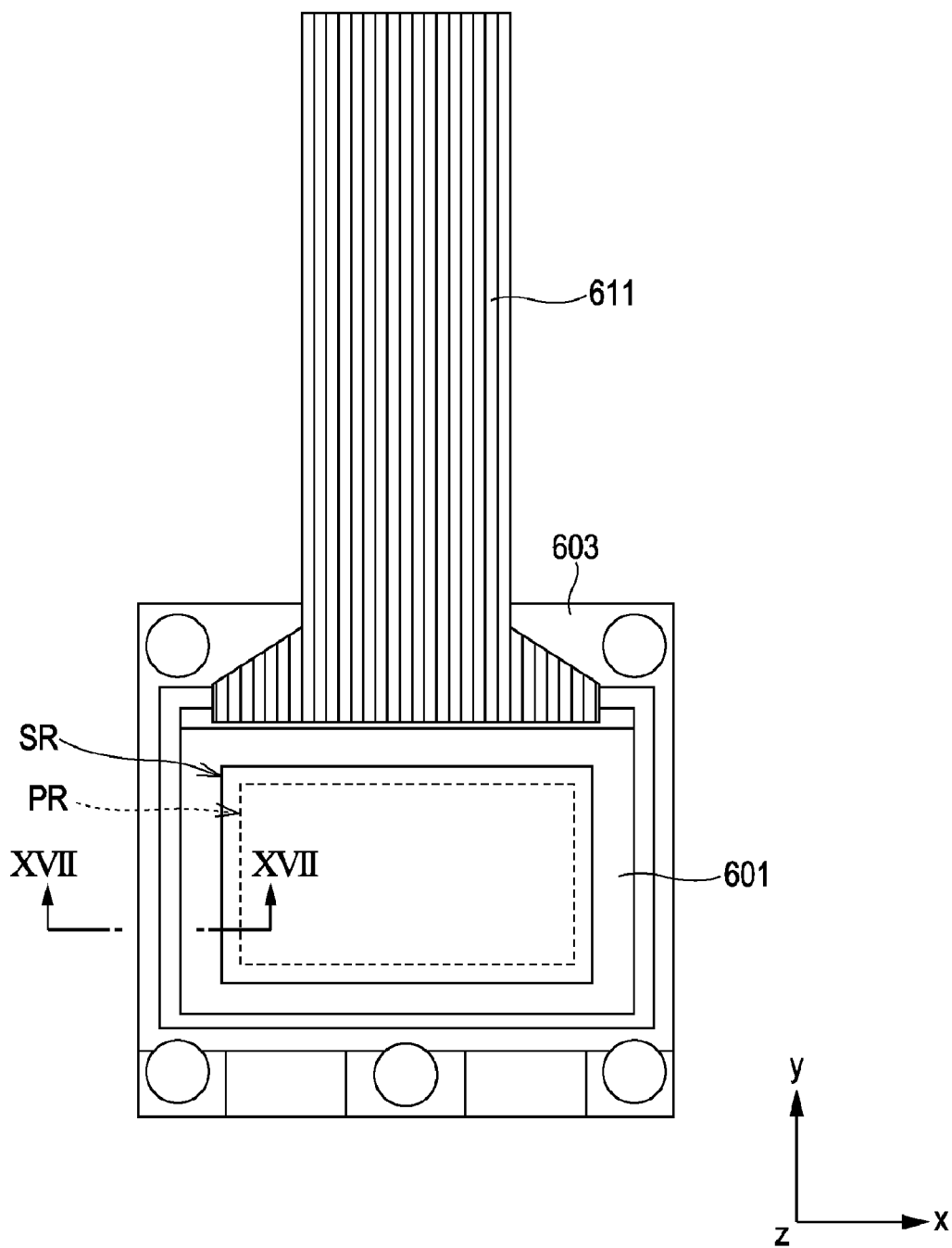
FIG. 16 is a plan view showing a first liquid crystal display portion according to a second embodiment of the present invention.
Figure 17:
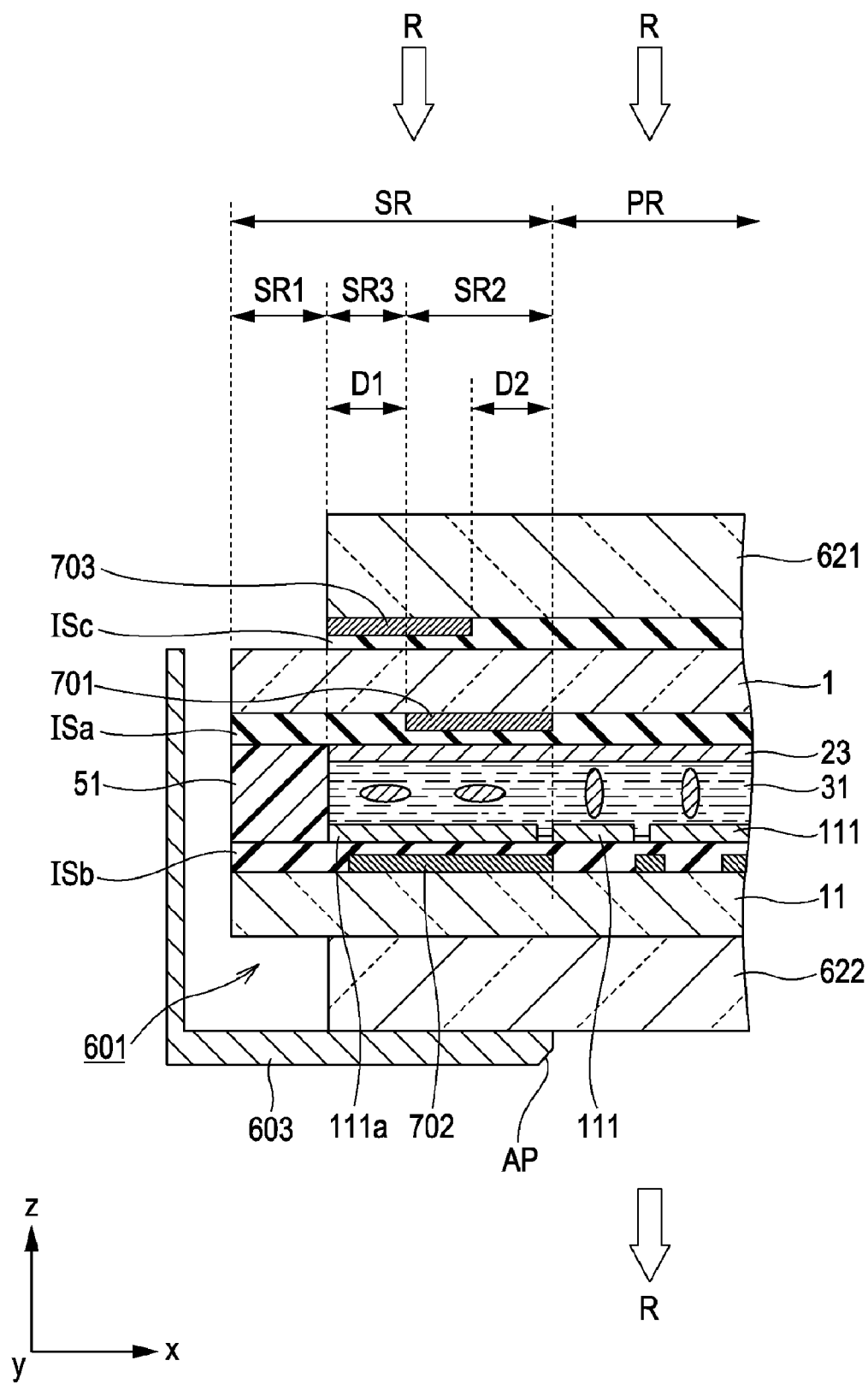
FIG. 17 is a cross section showing the first liquid crystal display portion according to the second embodiment of the present invention.

FIGS. 16 and 17 are illustrations showing a first LCD portion 541R according to a second embodiment of the present invention.

FIG. 16 is a plan view showing the first LCD portion 541R according to the second embodiment of the present invention. Also, FIG. 17 is a cross section showing the first LCD portion 541R according to the second embodiment of the present invention. FIG. 17 schematically illustrates a primary portion of the first LCD portion 541R, the cross section which is taken along line XVII-XVII in FIG. 16.

Referring to FIGS. 16 and 17, this embodiment is different from the first embodiment in that a light-shielding layer 703 is provided instead of the light-shielding plate 602. This embodiment is similar to the first embodiment except this point. Hence, description of similar configurations is omitted.

Referring to FIG. 17, the light-shielding layer 703 is provided on the surface of the first dustproof glass substrate 621 facing the liquid crystal panel 601, and is covered with a flattening film ISc made of an insulating material. The light-shielding layer 703 is made of a metal material such as aluminum, which is interposed between the polarizing plate 542R and the liquid crystal layer 31 so as to shield light by reflecting the red component light R to be incident on the polarizing plate 542R. The light-shielding layer 703 is formed, for example, by depositing a metal film using a metal material, and then performing pattern processing by lithography technology. The light-shielding layer 703 partially surrounds the peripheral region SR to prevent light from being incident on the peripheral circuits provided in the peripheral region SR. That is, the light-shielding layer 703 is formed to surround the periphery of the pixel region PR in a frame-like form.

In this embodiment, similarly to the light-shielding plate 602 in the first embodiment, the light-shielding layer 703 is provided in the peripheral region SR to cover at least the regions SR1 and SR3 except the region SR2 covered with the first light-shielding layer 701. The light-shielding layer 703 is located farther from the liquid crystal layer 31 than the first light-shielding layer 701 is. Also, referring to FIG. 17, the light-shielding layer 703 is provided at a distance from the boundary between the pixel region PR and the peripheral region SR of the liquid crystal panel 601 toward the peripheral region SR. Specifically, a distance D2 from the end portion of the light-shielding layer 703 located near the pixel region PR of the liquid crystal panel 601 to the boundary between the pixel region PR and the peripheral region SR of the liquid crystal panel 601 is determined to be 120 μm or larger. That is, the light-shielding layer 703 extends to cover a part of the pixel adjacent region SR2 in the peripheral region SR at a predetermined distance D2 apart from the end portion of the pixel region PR in a superposed manner.

When the first LCD 541R is to be manufactured in this embodiment, similarly to the first embodiment, the photocurable material provided at the formation region of the seal member 51 is irradiated with light, to form the seal member 51. Then, the first dustproof glass substrate 621 provided with the light-shielding layer 703 is arranged. Similarly to the first embodiment, the respective components are arranged, and thus the first LCD portion 541R is completed.

As described above, in this embodiment, the first light-shielding layer 701 formed at the counter substrate 1 and the light-shielding layer 703 formed at the first dustproof glass substrate 621 are provided in the peripheral region SR so that the linearly polarized light R1L transmitted through the polarizing plate 542R is not incident on the liquid crystal layer 31, but is reflected to the polarizing plate 542R. Accordingly, similarly to the first embodiment, the "stray light" can be prevented from being mixed into a displayed image.

Accordingly, with the present embodiment, image quality of a displayed image can be increased.

For implementation of the present invention, the present invention is not limited to the above-described embodiments, and may employ various modifications.

For example, in the above-described embodiments, while the present invention is applied to the three-plate liquid crystal projector, it is not limited thereto. For example, a similar advantage can be attained even when the present invention is applied to a single-plate liquid crystal projector. Also, the present invention may be applied to a direct-view liquid crystal display apparatus instead of a projection liquid crystal display apparatus.

In the above-described embodiments, while the two members are provided as a light-shielding portion for shielding incident light on the liquid crystal layer 31, it is not limited thereto. For example, both the light-shielding plate 602 in the first embodiment and the light-shielding layer 703 in the second embodiment may be used, and thus the three light-shielding portions may be provided. Alternatively, the number of light-shielding portions may be four or larger. Still alternatively, even when one of the light-shielding plate 602, and the light-shielding layers 701 and 703 is provided as the light-shielding portion, the "stray light" can be effectively prevented from being mixed into the displayed image.

In the above-described embodiment, while the liquid crystal panel has the peripheral electrode, it is not limited thereto.

In the above-described embodiments, while the liquid crystal panel is the active matrix type using the TFT, it is not limited thereto. For example, an active matrix liquid crystal panel using a TFD may be used. Alternatively, a simple matrix liquid crystal panel may be used.

While the liquid crystal mode is the VA mode in which liquid crystal having a negative permittivity is vertically aligned, it is not limited thereto. The liquid crystal mode may be any mode such as TN mode in which liquid crystal having a positive permittivity is aligned in a twisted manner, or ECB mode in which positive liquid crystal is aligned in anti-parallel. In any mode, a similar advantage can be attained. Further, even when a reflection liquid crystal panel is used, a similar advantage can be attained.

In the above-described embodiments, the counter substrate 1 corresponds to a first substrate of the present invention. In the embodiments, the TFT array substrate 11 corresponds to a second substrate of the present invention. In the embodiments, the liquid crystal layer 31 corresponds to a liquid crystal layer of the present invention. In the embodiments, the seal member 51 corresponds to a seal member of the present invention. In the embodiments, the peripheral electrode 111a corresponds to a peripheral electrode of the present invention. In the embodiments, the liquid crystal display apparatus 500 corresponds to a liquid crystal display apparatus of the present invention. In the embodiments, the light source 501 corresponds to a light source of the present invention. In the embodiments, the projection lens unit 571 corresponds to a projection lens of the present invention. In the embodiments, the polarizing plates 542R, 542G, and 542B at the incident side correspond to polarizing plates of the present invention. In the embodiments, the liquid crystal panel 601 corresponds to a liquid crystal panel of the present invention. In the embodiments, the light-shielding plate 602 corresponds to a light-shielding portion, or a second light-shielding portion, of the present invention. In the above-described embodiments, the first dustproof glass substrate 621 corresponds to a third substrate of the present invention. In the embodiments, the first light-shielding layer 701 corresponds to a light-shielding portion, or a first light-shielding portion, of the present invention. In the embodiments, the second light-shielding layer 702 corresponds to a light-shielding portion, or a third light-shielding portion, of the present invention. In the embodiments, the light-shielding layer 703 corresponds to a light-shielding portion, or a second light-shielding portion, of the present invention. In the embodiments, the pixel P corresponds to a pixel of the present invention. In the embodiments, the pixel region PR corresponds to a pixel region of the present invention. In the embodiments, the peripheral region SR corresponds to a peripheral region of the present invention.

It should be understood by those skilled in the art that various modifications, combinations, sub-combinations and alterations may occur depending on design requirements and other factors insofar as they are within the scope of the appended claims or the equivalents thereof.

What is claimed is:
1. A liquid crystal display apparatus comprising:
   a liquid crystal panel in which a liquid crystal layer is provided in a pixel region and a peripheral region;
   a reflection polarizing plate facing the pixel region and the peripheral region; and a light-shielding portion interposed between the liquid crystal layer and the polarizing plate in the peripheral region, and configured to shield light by reflecting light transmitted through the polarizing plate to the polarizing plate, wherein the light transmitted through the polarizing plate is incident on the pixel region to display an image, wherein the liquid crystal panel includes
  a first substrate facing the polarizing plate,
  a second substrate facing the polarizing plate through the first substrate, and facing the first substrate with a gap interposed therebetween, and
  a seal member configured to bond the first and second substrates together in the peripheral region, wherein the liquid crystal layer is interposed between the first and second substrates,
  the pixel region and the peripheral region are provided at mutually facing surfaces of the first and second substrates, and
  the seal member is made of a photo-curable material cured by irradiation with light, and wherein the light-shielding portion includes
  a first light-shielding portion configured to cover a pixel adjacent region, the pixel adjacent region being a partial region of the peripheral region adjacent to the pixel region except a seal region corresponding to an area where the seal member is arranged, and
  a second light-shielding portion configured to cover at least a region of the peripheral region except the region covered with the first light-shielding portion, wherein
    the first light-shielding portion is located closer to the liquid crystal layer than the second light-shielding portion is.

2. The liquid crystal display apparatus according to claim 1, wherein the second light-shielding portion is provided after the seal member is formed by curing the photo-curable material by the irradiation with the light.

3. The liquid crystal display apparatus according to claim 2, wherein the first light-shielding portion is provided at the first substrate.

4. The liquid crystal display apparatus according to claim 3, wherein a gap is provided between the first and second light-shielding portions in the peripheral region by a distance of 50 μm or smaller.

5. The liquid crystal display apparatus according to claim 4, wherein the first light-shielding portion is apart from an end portion of the seal region in the peripheral region by a distance of 100 μm or larger.

6. The liquid crystal display apparatus according to claim 5, wherein the liquid crystal panel further includes a peripheral electrode configured to apply a voltage to the liquid crystal layer interposed between the first and second substrates in the peripheral region.

7. The liquid crystal display apparatus according to claim 6, wherein the light-shielding portion further includes a third light-shielding portion formed at the second substrate in the peripheral region, and configured to shield light by reflecting light to be incident thereon through the liquid crystal layer.

8. The liquid crystal display apparatus according to claim 7, further comprising:
  a light source configured to irradiate the liquid crystal panel with light through the polarizing plate; and
  a projection lens configured to project light emitted from the pixel region on the liquid crystal panel irradiated with the light from the light source.

9. The liquid crystal display apparatus according to claim 8, further comprising:
  a light-transmissive third substrate arranged between the first substrate and the polarizing plate,
  wherein the second light-shielding portion is provided at the third substrate.

10. A liquid crystal panel comprising:
  a liquid crystal layer provided in a pixel region and a peripheral region;
  a reflection polarizing plate facing the pixel region and the peripheral region;
  a light-shielding portion interposed between the liquid crystal layer and the polarizing plate in the peripheral region, and configured to shield light by reflecting light transmitted through the polarizing plate to the polarizing plate;
  a first substrate facing the polarizing plate;
  a second substrate facing the polarizing plate through the first substrate, and facing the first substrate with a gap interposed therebetween; and
  a seal member configured to bond the first and second substrates together in the peripheral region,
  wherein the liquid crystal layer is interposed between the first and second substrates,
  wherein the pixel region and the peripheral region are provided at mutually facing surfaces of the first and second substrates,
  wherein the seal member is made of a photo-curable material cured by irradiation with light, and
  wherein the light-shielding portion includes
    a first light-shielding portion configured to cover a pixel adjacent region, the pixel adjacent region being a partial region of the peripheral region near the pixel region except a seal region corresponding to an area where the seal member is arranged, and
    a second light-shielding portion configured to cover at least a region of the peripheral region except the region covered with the first light-shielding portion, wherein
      the first light-shielding portion is located closer to the liquid crystal layer than the second light-shielding portion is.

* * * * *